(12) United States Patent  
Muramoto

(10) Patent No.: US 7,956,938 B2  
(45) Date of Patent: Jun. 7, 2011

(54) RETARDATION COMPENSATION PLATE, RETARDATION COMPENSATOR, LIQUID CRYSTAL DISPLAY DEVICE, AND PROJECTION-TYPE IMAGE DISPLAY DEVICE

(75) Inventor: Yutaka Muramoto, Miyagi (JP)

(73) Assignee: Sony Corporation, Tokyo (JP)

( * ) Notice: Subject to any disclaimer, the term of this patent is extended or adjusted under 35 U.S.C. 154(b) by 935 days.

(21) Appl. No.: 11/855,326

(22) Filed: Sep. 14, 2007

(65) Prior Publication Data

US 2008/0266470 A1   Oct. 30, 2008

(30) Foreign Application Priority Data

Sep. 14, 2006   (JP) .................. 2006-250143

(51) Int. Cl.
*G02F 1/1335* (2006.01)
*G02B 5/30* (2006.01)

(52) U.S. Cl. ............... 349/8; 349/119; 359/499

(58) Field of Classification Search ............ 349/5, 6, 349/7, 8, 9, 10, 99, 100, 101, 102, 103, 117, 349/118, 119, 120, 121; 359/499
See application file for complete search history.

(56) References Cited

U.S. PATENT DOCUMENTS

| 6,147,735 | A  | 11/2000 | Yamazaki et al. |
| 7,345,723 | B2 | 3/2008  | Robinson et al. |
| 2004/0263989 | A1 | 12/2004 | Cobb et al. |
| 2005/0259205 | A1 | 11/2005 | Sharp et al. |
| 2006/0215091 | A1* | 9/2006 | Muramoto et al. ........... 349/117 |
| 2008/0266470 | A1* | 10/2008 | Muramoto ........................ 349/8 |

FOREIGN PATENT DOCUMENTS

| JP | 3019813 | 1/2000 |
| JP | 2001-316432 | 11/2001 |
| JP | 2004-046156 | 2/2004 |
| JP | 2005-18071 | 1/2005 |
| JP | 2006-171327 | 6/2006 |
| JP | 2006-189753 | 7/2006 |
| JP | 2008-500596 | 1/2008 |
| JP | 2008-506974 | 3/2008 |
| WO | 2006/057309 | 11/2005 |

* cited by examiner

*Primary Examiner* — Brian M Healy
(74) *Attorney, Agent, or Firm* — K&L Gates LLP

(57) ABSTRACT

A retardation compensation plate having a birefringent property for compensating residual retardation of a liquid crystal panel includes: a combined unit formed of an optical multi-layered film composed of a plurality of layers having different refractive indices stacked in a regular order and a polymer film. In the retardation compensation plate, the retardation compensation plate and the liquid crystal panel have in-plane retardations that satisfy the relationship: $1 < R0c/R0p \leq 10$, where $R0c$ is an in-plane retardation of the retardation compensation plate and $R0p$ is an in-plane retardation of the liquid crystal panel.

20 Claims, 15 Drawing Sheets

RETARDATION COMPENSATION PLATE, RETARDATION COMPENSATOR, LIQUID CRYSTAL DISPLAY DEVICE, AND PROJECTION-TYPE IMAGE DISPLAY DEVICE

CROSS REFERENCE TO RELATED APPLICATIONS

The present application claims priority to Japanese Patent Application No. 2006-250143 filed in the Japanese Patent Office on Sep. 14, 2006, the entire content of which being incorporated herein by reference.

BACKGROUND

The present application relates to a retardation compensation plate used for compensating retardation of, for example, a liquid crystal panel, and a retardation compensator, a liquid crystal display device and a projection-type image display device using the same.

There has been known a projector device, realizing a large picture by performing enlarged projection of an image onto a screen, as a projection-type image display device. In particular in recent years, so-called liquid crystal projector device, which projects beams emitted from a light source onto a screen after being modulated by a liquid crystal display device, has been disseminated. The liquid crystal display device displays images, based on a display mode corresponded to species of liquid crystal molecules used for the liquid crystal panel.

For example, a VA (vertically aligned) mode liquid crystal display device has widely been known. The VA mode liquid crystal display device includes liquid crystal molecules, sealed between a pair of substrates constituting the liquid crystal panel, showing negative dielectric anisotropy. In the VA-mode liquid crystal display device, the liquid crystal molecules, under no electric field applied thereto, align nearly perpendicular to the main surface of the substrate, so that beam can pass through the liquid crystal layer almost without altering its polarization plane. As a consequence, an excellent black state is obtained under no applied voltage, by disposing polarizing plates on the upper and lower sides of the substrate. On the contrary, under electric field applied thereto, the molecules align obliquely to the main surface of the substrate, and the resultant birefringence rotates the polarization plane of the incident light beam. The VA-mode liquid crystal display device has an advantage over a TN (Twisted Nematic) mode liquid crystal display device, in that it realizes higher contrast.

The VA-mode liquid crystal display device is configured to obtain a birefringent property by obliquely aligning the liquid crystal molecules under an electric field applied thereto. Therefore, the device preliminarily aligns the liquid crystal molecules, under no electric field applied thereto, at an extremely small angle of inclination (pre-tilt angle). Because the liquid crystal molecules under no electric field applied thereto are aligned as being slightly inclined in this way, rather than being completely perpendicular to the main surface of the substrates, the liquid crystal panel induces residual retardation. For this reason, the polarization plane of incident light from the vertical direction rotates slightly, consequently resulting in leakage of light from the polarizing plate and lowered contrast.

The VA mode also gives retardation to obliquely incident light in the absence of electric field. Therefore the device lowers the contrast, when the cone angle of incident light increases (F# is decreased) to obtain higher brightness (luminance).

On the other hand, there has been known a projection-type image display device, such as a three-plate-type liquid crystal projector having three liquid crystal panels corresponded to each color of RGB. The projection-type image display device generally adopts a prism-type polarization beam splitter (PBS) for polarization splitting. However, the prism-type polarization beam splitter suffers from large angular dependence, and results in lowering in contrast. Limitation of the cone angle aimed at ensuring the contrast results in disadvantage in terms of brightness (luminance).

Thus, it has been proposed that a λ/4 plate (quarter-wave plate) is disposed between the liquid crystal panel and the polarizing plate to correct lowering in contrast induced by the prism-type polarization beam splitter (see Japanese Patent Publication No. 3019813 (hereinafter referred to as "patent document 1")).

In place of using the prism-type polarization beam splitter, it also has been proposed that a wire-grid polarizer showing only a small angular dependence, a reflection-type liquid crystal panel, and a retardation plate compensating the residual retardation ascribable to the pre-tilt angle of the liquid crystal panel and retardation to obliquely incident light are combined (see Japanese Unexamined Patent Application Publication No. 2005-18071 (hereinafter referred to as "patent document 2")).

Japanese Unexamined Patent Application Publication No. 2006-189753 (hereinafter referred to as "patent document 3") discloses a liquid crystal projector by using a retardation compensation element composed of a first optically anisotropic layer having high-refractive-index layers and low-refractive-index layers, made of an inorganic material, alternately stacked therein, and a second optically anisotropic layer having polymerizable liquid crystal compound kept in hybrid alignment, so that angle of alignment of molecules thereof is varied in the thickness-wise direction of the liquid crystal element, and thereby compensating retardation induced by the liquid crystal element.

However, rotation of the polarization plane caused due to the pre-tilt angle varies depending on the liquid crystal panel, so that the residual retardation to be compensated varies from panel to panel. Because of variation in the angle of placement of other optical components, it is difficult to stably adjust the contrast, only simply by disposing a quarter-wave plate between the liquid crystal panel and the polarizing plate.

On the other hand, one possible method of adjusting the contrast may be such as rotating the quarter-wave plate around an axis which stands vertically on the center of the liquid crystal panel. The quarter-wave plate, however, causes a large amount of variation in retardation with respect to the angle of rotation, and needs an extreme precision in rotation of the quarter-wave plate (0.5° or smaller, for example), making it difficult to optimize the contrast.

The combination of an inorganic optical multi-layered film and a liquid crystal described in the patent document 3 raises the following problems.

First of all, the liquid crystal largely varies the retardation in association with changes in temperature, proving only a limited environmental resistance. A high level of environmental resistance is required for the retardation compensation plate which is exposed to high-luminance beam in the projection-type image display device.

When a wire-grid polarizer, as an alternative of the prism-type polarization beam splitter, having only a small angular dependence, a reflection-type liquid crystal panel, and a retardation compensation plate compensating the residual retardation ascribable to the pre-tilt angle of the liquid crystal panel and retardation caused by obliquely incident light the liquid crystal panel or retardation are combined in the projection-type image display device such as three-plate-type liquid crystal projector, in-plane retardation required for the retardation compensation plate will be extremely small. Any effort of controlling such fine retardation will need a very precise technique of coating, raising difficulties in controlling the retardation and in-plane non-uniformity in the direction of optical axis.

Moreover, when liquid crystal is used for controlling such fine retardation, in-plane difference in refractive index ($\Delta n0$) generally has a value of as large as $\Delta n0 > 0.1$. If $\Delta n0$ has a large value, state of polarization of the reflected beam is partially converted due to difference in reflection coefficients between the normal wave and the abnormal wave, and thereby leakage of light from the wire-grid and lowering in contrast are observed. Because an AR coating for preventing reflective light can be optimized only for a single refractive index, it is very difficult to prevent reflection of both of normal wave and abnormal wave. Large $\Delta n0$ therefore degrades the anti-reflection effect, and thereby lowers the contrast. Although lowering in $\Delta n0$ may be an effective countermeasure, use of liquid crystal raises a need of complicated process such as immersion thereof into an isotropic compound, making it difficult to lower $\Delta n0$.

SUMMARY

The present application addresses the above-identified problems associated with the current technologies to provide a retardation compensation plate, a retardation compensator, a liquid crystal display device and a projection-type image display device, ensuring easy adjustment in contrast, flexible adoptability to variation among the liquid crystal panels, excellence in environmental resistance, and easy acquisition of fine in-plane retardation.

In accordance with an illustrative embodiment, there is provided a retardation compensation plate having a birefringent property for compensating residual retardation of a liquid crystal panel including a combined unit formed of an optical multi-layered film and a polymer film. The optical multi-layered film is composed of a plurality of layers having different refractive indices stacked in a regular order. In the retardation compensation plate, the retardation compensation plate and the liquid crystal panel have in-plane retardations that satisfy the relationship: $1 < R0c/R0p \leq 10$, where $R0c$ is an in-plane retardation of the retardation compensation plate and $R0p$ is an in-plane retardation of the liquid crystal panel.

In the retardation compensation plate, the vertical retardation of the retardation compensation plate is obtained by the optical multi-layered film, and so that the in-plane retardation is obtained by the polymer film.

The optical multi-layered film is preferably a form birefringent film. The form birefringent film refers to a multi-layered structure having a plurality of layers differed from each other in refractive index, periodically stacked therein while keeping an optical thickness smaller than the reference wavelength, and allows the one to readily and precisely obtain an arbitrary vertical retardation simply by controlling the thickness. Because the form birefringent film conversely has an in-plane retardation of 0, it is combined with a polymer film to exhibit in-plane retardation.

By combining the form birefringent film with the polymer film, the retardation compensation plate makes it possible to ensure excellence in environmental resistance, only small in-plane retardation, vertical retardation and non-uniformity in the direction of optical axis, excellent controllability in the vertical retardation, and only a small in-plane refractive index difference.

In the retardation compensation plate of the illustrative embodiment, the in-plane retardation $R0c$ of the retardation compensation plate and the in-plane retardation $R0p$ of the liquid crystal panel satisfy the relation of $1 < R0c/R0p \leq 10$, so that it becomes possible to reduce variation in retardation to be compensated depending on the angle of rotation of the retardation compensation plate set with respect to the liquid crystal panel. As a consequence, the contrast becomes readily adjustable, and the plate can flexibly be adapted to variation in residual retardation inherent to the individual liquid crystal panels.

Furthermore, a retardation compensator using the above-described retardation compensation plate makes it possible to compensate the residual retardation of the liquid crystal panel in more easy and precise manner, and thereby to readily adjust the contrast of the liquid crystal display device. As a consequence, the liquid crystal display device or the projection-type image display device successfully is improved in contrast.

As has been described in the above, contrast of the liquid crystal panel is adjustable in easy and precise manner.

Additional features and advantages are described herein, and will be apparent from, the following Detailed Description and the figures.

DETAILED DESCRIPTION

Embodiments of the present application will be explained below, referring to the attached drawings.

The retardation compensation plate and the retardation compensator of one embodiment of the present application are used for compensating residual retardation of the liquid crystal panel, in the projection-type image display device liquid crystal display device. First, an exemplary configuration and operations of a projection-type image display device will be explained, referring to FIG. 1.

[Projection-Type Image Display Device]

Figure 1:
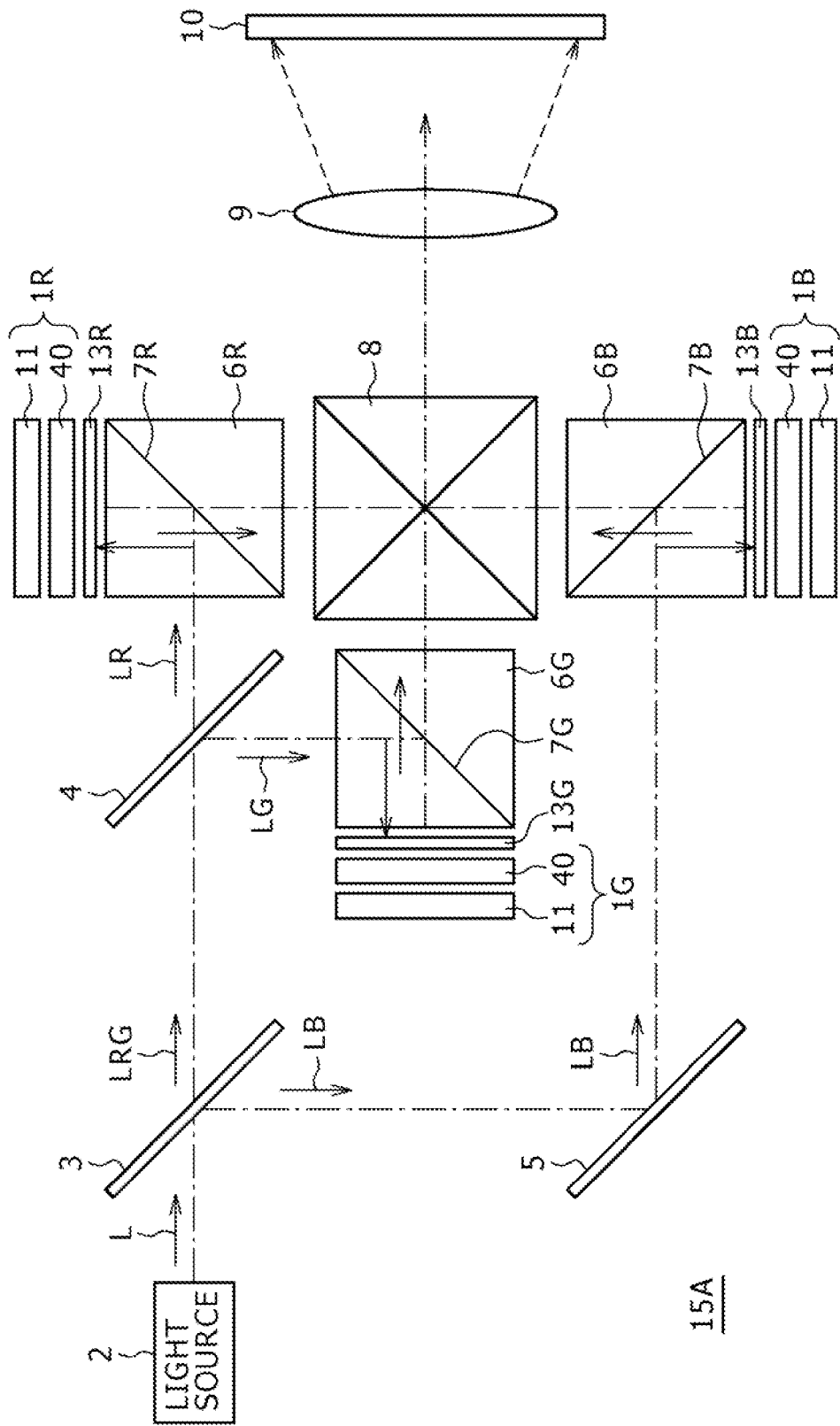
FIG. 1 is a schematic drawing showing a configuration of a projection-type image display device according to an embodiment.

FIG. 1 is a schematic drawing showing a configuration of a projection-type image display device 15A according to an embodiment of the present application. The projection-type image display device 15A is a so-called, three-plate-type liquid crystal projector device, displaying color image using three liquid crystal light bulbs dedicated for each color of red, green and blue. As shown in FIG. 1, the projection-type image display device 15A has liquid crystal display devices 1R, 1G, 1B, a light source 2, dichroic mirrors 3, 4, a total reflection mirror 5, polarization beam splitters 6R, 6G, 6B, a synthesizing prism 8, and a projection lens 9.

The light source 2 emits light source beam (white light) L containing blue light LB, green light LG and red light LR, necessary for displaying color image, and typically has a halogen lamp, metal halide lamp, xenon lamp, or the like.

The dichroic mirror 3 splits the light source beam L into blue light LB and light of the other colors LRG. The dichroic mirror 4 splits the light LRG passed through the dichroic mirror 3 into red light LR and green light LG. The total reflection mirror 5 reflects blue light LB split by the dichroic mirror 3 towards the polarization beam splitter 6B.

The polarization beam splitters 6R, 6G, 6B are prism-type polarization beam splitters disposed on light paths of red light LR, green light LG and blue light LB, respectively. These polarization beam splitters 6R, 6G, 6B have polarization splitting planes 7R, 7G, 7B, and respectively function as splitting the incident light beams of the individual colors on the polarization planes 7R, 7G, 7B into two polarization components orthogonal to each other. The polarization splitting planes 7R, 7G, 7B allows one polarization component (S-polarization component, for example) to reflect thereon, and the other polarization component (P-polarization, for example) to transmit therethrough.

The liquid crystal display devices 1R, 1G, 1B receive the beams of the individual colors having a predetermined polarization component (S-polarization component, for example) split on the polarization splitting planes 7R, 7G, 7B of the polarization beam splitters 6R, 6G, 6B. The liquid crystal display devices 1R, 1G, 1B are driven corresponding to drive voltage given based on video signals, and modulate the incident light, and also reflect thus modulated light towards the polarization beam splitters 6R, 6G, 6B.

Between the polarization beam splitters 6R, 6G, 6B and the liquid crystal display devices 1R, 1G, 1B, there are disposed λ/4 plates (quarter-wave plates) 13R, 13G, 13B, respectively, and a retardation compensator 40. The quarter-wave plates 13R, 13G, 13B correct lowered contrast ascribable to angular dependence of the incident light inherent to the polarization beam splitters 6R, 6G, 6B. The retardation compensator 40 compensates residual retardation of the liquid crystal panels instituting the liquid crystal display devices 1R, 1G, 1B. The retardation compensator 40 will be detailed later.

The synthesizing prism 8 synthesizes the beams of the individual colors having a predetermined polarization component (P-polarization component, for example) emitted from the liquid crystal display devices 1R, 1G, 1B and passed through the polarization beam splitters 6R, 6G, 6B. The projection lens 9 projects the synthesized beam emitted from the synthesizing prism 8 onto a screen 10.

Operations of projection-type image display device 15A configured described above will be explained next.

First, white light L emitted from the light source 2 is split with the aid of a function of dichroic mirror 3 into blue light Lb and light of the other colors (red light and green light) LRG. Of these, blue light LB is reflected with the aid of a function of the total reflection mirror 5 towards the polarization beam splitter 6B.

On the other hand, the light of the other colors (red light and green light LRG) are further split with the aid of a function of the dichroic mirror 4 into red light LR and green light LG. Thus split red light LR and green light LG are brought into the polarization beam splitters 6R, 6G, respectively.

The polarization beam splitters 6R, 6G, 6B split, on the polarization splitting planes 7R, 7G, 7B thereof, the incident light beams of the individual colors into two polarization components orthogonal to each other. In this process, the polarization splitting planes 7R, 7G, 7B reflect one polarization component (S-polarization component, for example) towards the liquid crystal display devices 1R, 1G, 1B, respectively. The liquid crystal display devices 1R, 1G, 1B are driven corresponding to drive voltage given based on video signals, and function as modulating the incident predetermined polarization component on the pixel basis.

The liquid crystal display devices 1R, 1G, 1B reflect the modulated beams of the individual colors towards the polarization beam splitters 6R, 6G, 6B. The polarization beam splitters 6R, 6G, 6B allow only predetermined polarization components (P-polarization components, for example), out of the reflected beams (modulated beams) received from the liquid crystal display devices 1R, 1G, 1B, to transmit therethrough, and emit them to the synthesizing prism 8.

The synthesizing prism 8 synthesizes the predetermined polarization components of the individual colors transmitted through the polarization beam splitters 6R, 6G, 6B, and emits the synthesized beam towards the projection lens 9. The projection lens 9 projects the synthesized beam emitted from the synthesizing prism 8 towards the screen 10. In this way, an image corresponded to the beams modulated by the liquid crystal display devices 1R, 1G, 1B is projected onto the screen 10, whereby a predetermined image is displayed.

Figure 2:
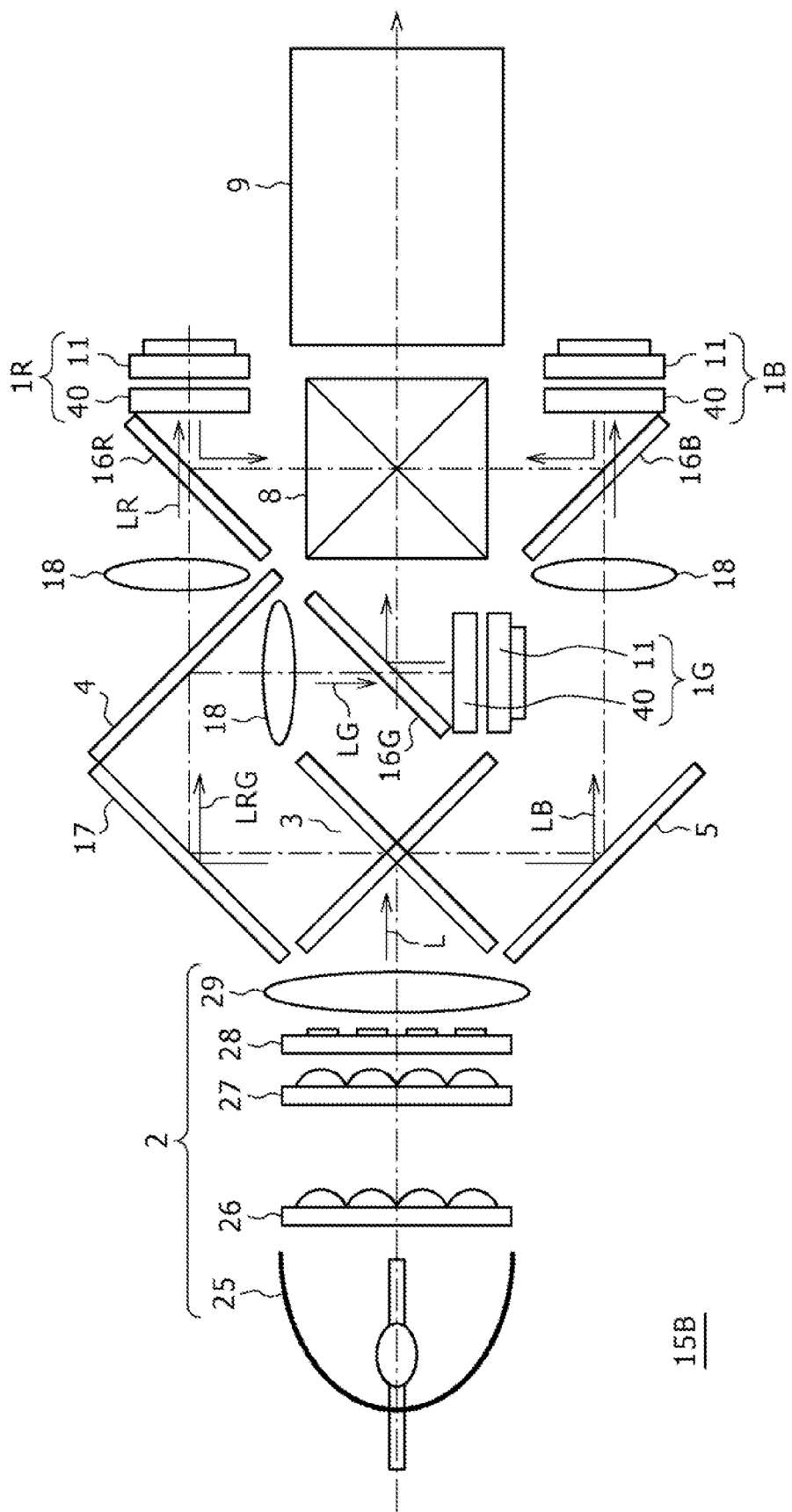
FIG. 2 is a schematic drawing showing a configuration of a projection-type image display device according to another embodiment.

FIG. 2 shows another exemplary configuration of the projection-type image display device according to one embodiment of the present application. A projection-type image display device 15B shown herein has, as the polarization beam splitters, wire-grid polarizers 16R, 16G, 16B disposed therein, in place of the prism-type polarization beam splitter 6 shown in FIG. 1. It is to be noted that any components corresponded to those shown in FIG. 1 are given with the same reference numerals.

The wire-grid polarizer is lower in angular dependence of incident light beam and more excellent in heat resistance, as compared with the prism-type polarization beam splitter, and therefore no more needs the quarter-wave plate, and is appropriately adoptable as the polarization beam splitter for the projection-type image display device using a large-energy light source. Also in this case, an image is displayed onto a screen (not shown) according to the operations similar to as shown in FIG. 1.

In FIG. 2, the reference numeral 17 represents a total reflection mirror, and the reference numeral 18 represents a relay lens. FIG. 2 shows an exemplary configuration of the light source 2. The reference numeral 25 represents a lamp unit emitting source beam L, the reference numerals 26, 27 are a pair of micro-lens arrays making luminance of the source beam L uniform, the reference numeral 28 represents a PS conversion element converting the direction of polarization of the source beam L into a unidirectional polarization wave, and the reference numeral 29 represents a positional adjustment lens adjusting position of irradiation of the source beam L.

The wire-grid polarizer is configured so that a plurality of thin metal wires are formed on a transparent substrate such as glass substrate, according to a grid pattern having a pitch, width and height all smaller than wavelength of the incident light beam, and expresses a predetermined polarization characteristic by reflecting the polarization component parallel with the thin wires, and allowing the polarization component orthogonal to the thin metal wires to transmit therethrough. The wire-grid polarizer functions as a polarization beam splitter when it is disposed perpendicular to the incident light beam. When the wire-grid polarizer is used as a polarization beam splitter, a polarization plate becomes unnecessary for the liquid crystal display device.

Figure 3:
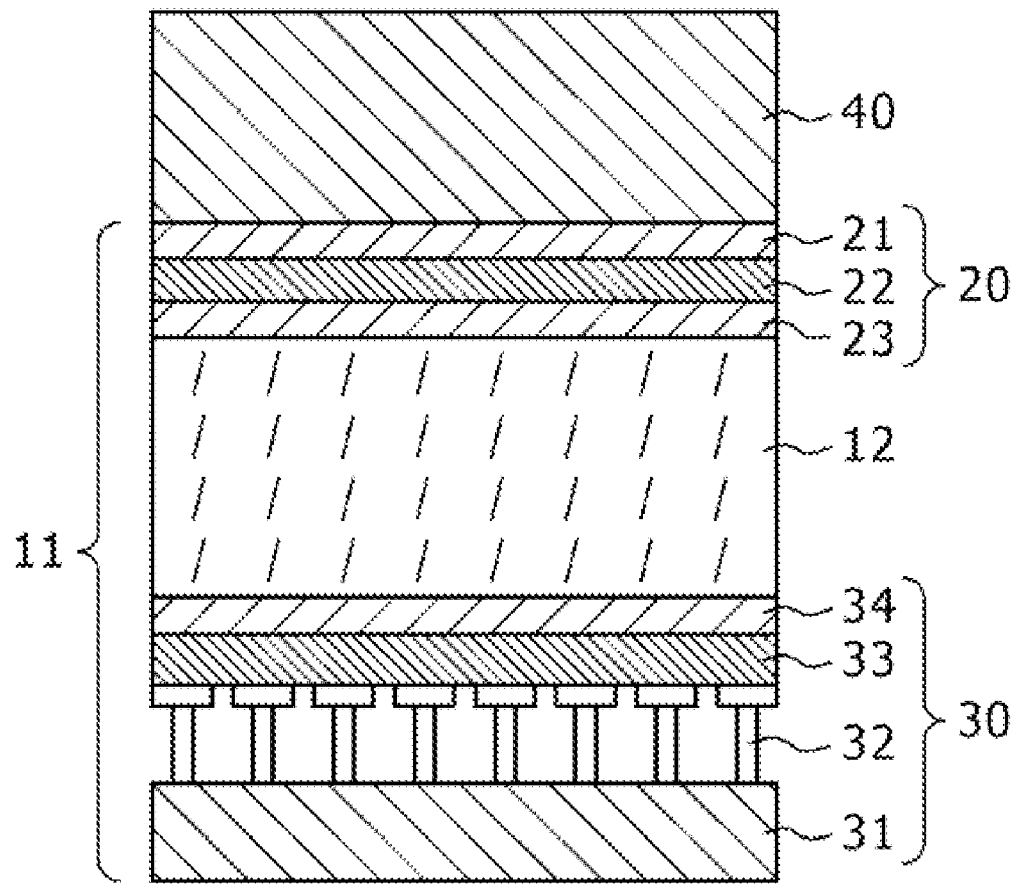
FIG. 3 is a sectional view schematically showing a configuration of a liquid crystal display device according to an embodiment.

Next, the liquid crystal display devices 1R, 1G, 1B will be explained referring to FIG. 3. FIG. 3 is a sectional view showing an exemplary configuration of the liquid crystal display devices 1R, 1G, 1B according to one embodiment of the present application. As shown in FIG. 3, each of the liquid crystal display devices 1R, 1G, 1B has a liquid crystal panel 11 as a light bulb, and a retardation compensator 40 disposed on the liquid crystal panel 11 on the side thereof counter to the polarization beam splitter.

The liquid crystal panel 11 is, for example, a reflection-type, vertically-aligned liquid crystal display element having liquid crystal molecules vertically aligned under no voltage applied thereto, and has a counter substrate 20 and a pixel electrode substrate 30 disposed as being counter with each other, and a liquid crystal layer 12 having therein a liquid crystal as being sealed between the counter substrate 20 and the pixel electrode substrate 30. The liquid crystal constituting the liquid crystal layer 12 is a liquid crystal having a negative dielectric anisotropy, and for example a nematic liquid crystal having a negative dielectric anisotropy.

The counter substrate 20 has a transparent electrode 22 and an alignment film 23 stacked in this order on a transparent base 21. The transparent base 21 is a glass substrate composed of, for example, soda glass, alkali metal-free glass, quartz glass or the like. The transparent electrode 22 is composed of, for example, a transparent electro-conductive oxide material such as ITO (indium tin oxide) which is a solid solution of tin oxide ($SnO_2$) and indium oxide ($In_2O_3$). The transparent electrode 22 is set to a common potential (ground potential, for example) over the entire pixel region.

The alignment film 23 is composed of, for example, a polyimide-base organic compound. The surface of the alignment film 23, faced to the liquid crystal layer 12 side, is rubbed for the purpose of aligning the liquid crystal molecules constituting the liquid crystal layer 12 to a predetermined direction.

The pixel electrode substrate 30 has a reflective electrode layer 33 and an alignment film 34 stacked in this order on a support substrate 31. The support substrate 31 is a silicon substrate, for example, and has switching elements 32 of C-MOS (complementary metal oxide semiconductor) type, for example, formed thereon. The reflective electrode layer 33 has a plurality of reflection-type pixel electrodes. The pixel electrodes are configured to be applied with drive voltage by the above-described switching elements 32.

A material of the pixel electrodes is preferably as the one having a large reflectivity of visible light, exemplified by aluminum. Similarly to the alignment film 23 of the counter substrate 20, also the alignment film 34 is composed of a polyimide-base organic compound, and is rubbed on the surface thereof faced to the liquid crystal layer 12 side, for the purpose of aligning the liquid crystal molecules composing the liquid crystal layer 12 to a predetermined direction.

[Retardation Compensator]

Next, the retardation compensator 40 according to one embodiment of the present application will be detailed. The retardation compensator 40 is provided on the liquid crystal panel 11, configured as described in the above, of each of the liquid crystal display devices 1R, 1G, 1B.

Figure 4:
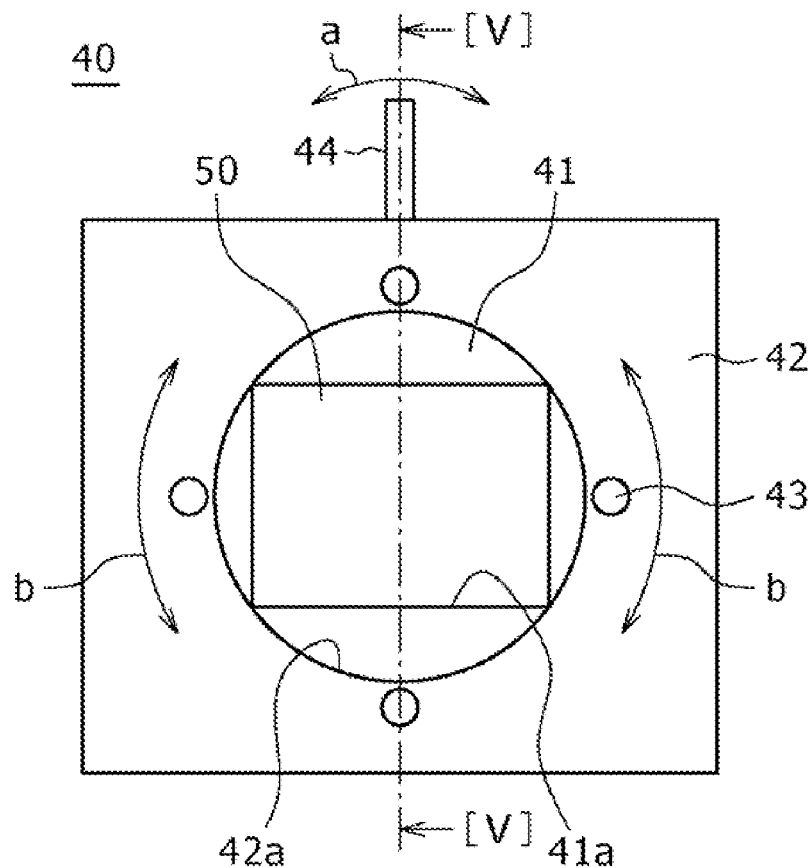
FIG. 4 is a plan view showing a configuration of a retardation compensator according to an embodiment.
Figure 5:
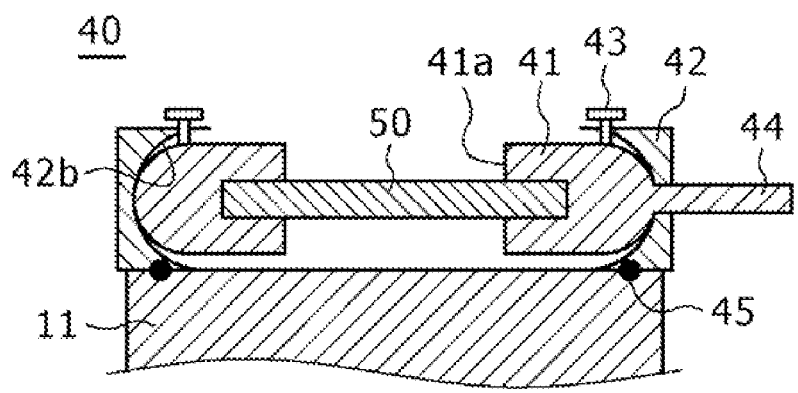
FIG. 5 is a sectional view taken along line [v]-[v] in FIG. 4.

FIG. 4 is a plan view showing an example of the retardation compensator 40. FIG. 5 is a sectional view showing an example of the retardation compensator 40. As shown in FIG. 4 and FIG. 5, the retardation compensator 40 has a retardation compensation plate 50, a rotating component 41 rotating the retardation compensation plate 50, and a housing portion 42 holding the rotating component 41 as being freely rotatable around an axis, perpendicular to the main surface of the liquid crystal panel 11.

As shown in FIG. 5, the retardation compensator 40 is fixed to the liquid crystal panel 11 as being brought into close contact via an O ring 45 as a sealing component. By virtue of such fixation through close contact, a dust-proofing effect between the liquid crystal panel 11 and the retardation compensator 40 is obtained. The rotating component 41 and the housing portion 42 configure an example of the rotating unit in one embodiment of the present application.

The rotating component 41 has a disk geometry, and has a rectangular opening 41a at the center thereof. The rotating component 41 is configured to hold therein a retardation compensation plate 50, and to allow the retardation compensation plate 50 to expose out from the opening 41a when the retardation compensation plate 50 is held inside the rotating component 41.

The housing portion 42 holds the rotating component 41 as being freely rotatable around an axis perpendicular to the main surface of the liquid crystal panel 11, in the in-plane direction of the liquid crystal panel 11. The housing portion 42 is a rectangular plate, and has a circular opening 42a at the center thereof. The side face 42b of the opening 42a is uniformly concaved so as to allow engagement of the rotating component 41. On the side face of the housing portion 42, there is provided an angular adjustment component 44 connected to the end face of the rotating component 41, wherein movement of the angular adjustment component 44 in the direction of arrow "a" correspondingly induces rotation of the rotating component 41 in the direction of arrow "b".

Around the opening 42a, there are provided one, or two or more fixing screws 43 fixing the position of the rotating component 41. For the case where the two or more fixing screws 43 are provided, the fixing screws 43 are provided at regular intervals around the opening 42a. Method of fixing the rotating component 41 after the adjustment is not limited to a method of using the fixing screws 43, but may be such as fixing the rotating component 41 to the housing portion 42 by adhesion using an adhesive, or may be such as additionally providing a clamp mechanism mechanically keeping the adjusted position of the angular adjustment component 44.

The retardation compensator 40 of this embodiment is provided between each of the polarization beam splitters 6R, 6G, 6B or each of the wire-grid polarizers 16R, 16G, 16B and the front surface of the liquid crystal panel 11, respectively (FIG. 1, FIG. 2). Contrast adjustment is performed by rotating the retardation compensation plate 50 around an axis perpendicular to the liquid crystal panel 11 so as to appropriately set the angle of inclination of the slow axis of the retardation compensation plate 50 with respect to the slow axis of the liquid crystal panel 11. The direction of slow axis of the retardation compensation plate 50 is set through rotating operation of the angular adjustment component 44 in the direction of arrow "a".

[Retardation Compensation Plate]

As the retardation compensation plate (retarder) used for compensating residual retardation inherent to the liquid crystal panel or optical components in the projection-type image display device such as the three-plate-type liquid crystal projector device, those of film type, crystal type, and liquid crystal type are known. The retardation compensation plates of these types, however, suffer from problems in non-uniformity of retardation in the vertical direction and the in-plane direction, durability, costs and so forth.

Namely, in those of film type, the vertical retardation is adjusted only to a fixed value because it is determined by thickness of the film, although the in-plane retardation is adjustable through rotation. For this reason, increase in the number of species of the film is inevitable for the case where adjustment is necessary for each color or for each liquid crystal panel. Further, in the case of using a plurality of films stacked therein, it becomes more likely to cause defects such as dust adhesion, due to increased number of sites of bonding. In-plane uniformities of the retardation and optical axes degrade with increase in the number of films.

On the other hand, those of crystal type suffer from a problem of high cost despite of its excellent durability. They also require highly sophisticated adjustment in the thickness due to their large $\Delta n0$ (in-plane difference in refractive index), so that bonding under most precise angular adjustment is necessary for the purpose of obtaining small retardation. In addition to this, if an adjustment is conducted for each color of RGB or for each liquid crystal panel, wave plates differing from each other in the thickness will be necessary.

Those of liquid crystal type inherently suffer from difficulty in coating while ensuring a small retardation, so that it is difficult to precisely control the thickness of coating if an adjustment is conducted for each color of RGB or for each liquid crystal panel. Moreover, the durability is low due to its large temperature-dependent variation in retardation. Furthermore, because $\Delta n0$ is large, it is difficult to prevent reflection, causing large changes in the state of polarization of the reflected beam.

Therefore in this embodiment, a form birefringent film is used as the retardation compensation plate excellent in environmental resistance, Rth controllability and small in non-uniformity of retardation. The form birefringent film is an optical multi-layered film composed of a plurality of layers having different refractive indices, for example, a repeating structure of a first and a second optical films, and refers in particular to those having an optical thickness of each layer sufficiently smaller than the target reference wavelength, set to as small as 1/200 to 1/10 times or below, for example. By setting the optical thickness of each layer shorter than the reference wavelength, interference of light between the individual layers is avoidable, and changes in the transmission/reflection characteristics of light can be prevented. For this reason, the form birefringent film is discriminated from anti-reflection film or optical filter which controls transmission/reflection characteristics of light making use of interference of light.

The form birefringent film is characterized by $nx=ny>nz$, showing a characteristic of a negative C-plate. The refractive index is determined by n1, n2 and film thicknesses a, b, expressed as follows:

first layer: refractive index=n1, thickness=a;
second layer: refractive index=n2, thickness=b;
total thickness: d;
difference in refractive index in vertical direction:

$$\Delta nth=ne-no(ne<no);$$

$$no^2=\{a\cdot n1^2/(a+b)\}+\{b\cdot n2^2/(a+b)\},$$

$$1/ne^2=\{a/n1^2(a+b)\}+\{b/n2^2(a+b)\} \quad (1)$$

where $no=nx=ny$ and $ne=nz$. Difference in retardation Rth in the vertical direction is determined by:

$$Rth=\Delta nth\cdot d \quad (2).$$

Figure 6:
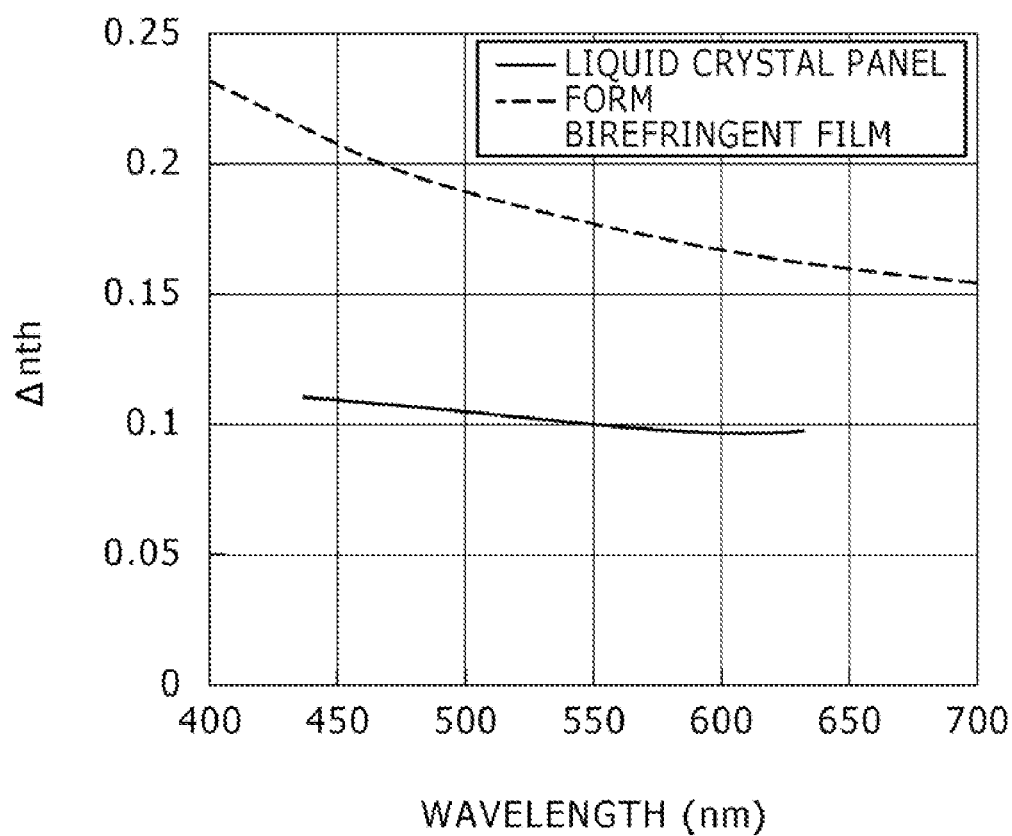
FIG. 6 is a drawing showing exemplary wavelength dependence of vertical retardation in a form birefringent film constituting the retardation compensation plate and in a liquid crystal panel.

On the other hand, the residual retardation of the liquid crystal panel or the other components has a dispersion characteristic, showing different values in the individual bands of RGB, so that retardation values required for the retardation compensation plates will differ respectively for RGB. Because the retardation compensation plates and the liquid crystal panel differ in the dispersion, color difference may be improved if the retardation compensation plates can be optimized over the entire range of visible light. It is, however, necessary for the retardation compensation plates for RGB to individually alter the configuration, so as to optimize them to different retardation. FIG. 6 is a drawing showing an exemplary comparison between dispersion between the liquid crystal panel and the form birefringent film. The form birefringent film expressed in this example is a multi-layered film having a $SiO_2$ film and a $Nb_2O_5$ film, respectively having a thickness of 10 nm, stacked therein.

If the retardation compensation plate is such as those of the above-described film, crystal type or liquid crystal type, controls of the number and species of films to be stacked and fine adjustment in the thickness of coating and the like are required, so that it is difficult to control Rth to thereby increase the cost. On the other hand, use of the form birefringent film allows control of Rth simply by optimizing the total thickness, without causing increase in the number of species of the materials, and without raising a need of introducing a new control technique. As a consequence, retardation compensation plate of the form birefringent film is readily optimized also in the dispersion, raising an advantage in terms of the cost.

Figure 7:
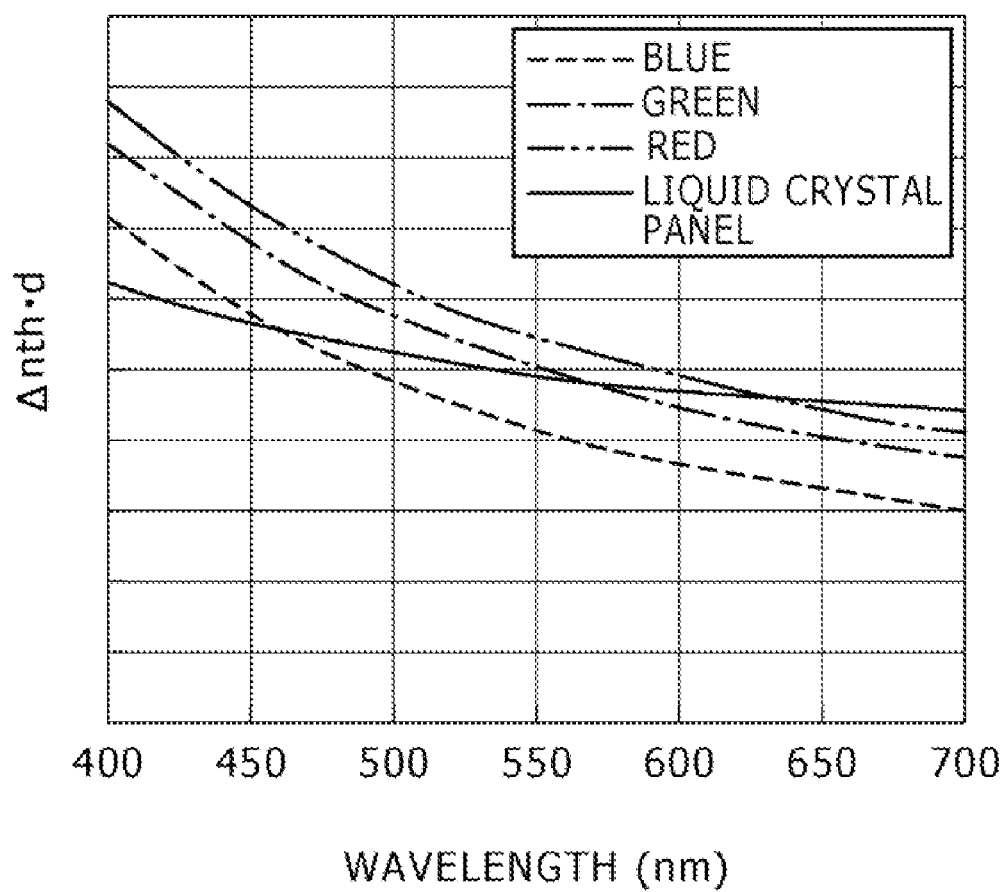
FIG. 7 is a drawing showing exemplary wavelength dependence of vertical retardation in a form birefringent film optimized in thickness for each of RGB colors, and in a liquid crystal panel.

FIG. 7 shows dispersion of the vertical retardation (Rth=Δnth·d) of the form birefringent film in the example shown in the FIG. 6, as being optimized in the total thickness in the individual bands of RGB. The residual retardation of the liquid crystal panel becomes maximum in the blue band, and becomes minimum in the red band. As a consequence, the number of layer becomes maximum in the blue band, and becomes minimum in the red band. As has been described in the above, unlike the case of using film or liquid crystal, the form birefringent film type retardation compensation plate obtains an optimum retardation over the entire range of visible light, simply by controlling the number of layers, allowing efficient retardation compensation. In addition, appropriate retardation compensation is ensured in the projection-type image display devices 15A, 15B configured as described above, by adopting the retardation compensation plates optimized for each color while being differed in the thickness of the form birefringent film, to the retardation compensators 40 disposed corresponding to the liquid crystal display devices 1R, 1G, 1B for the individual colors.

Figure 8:
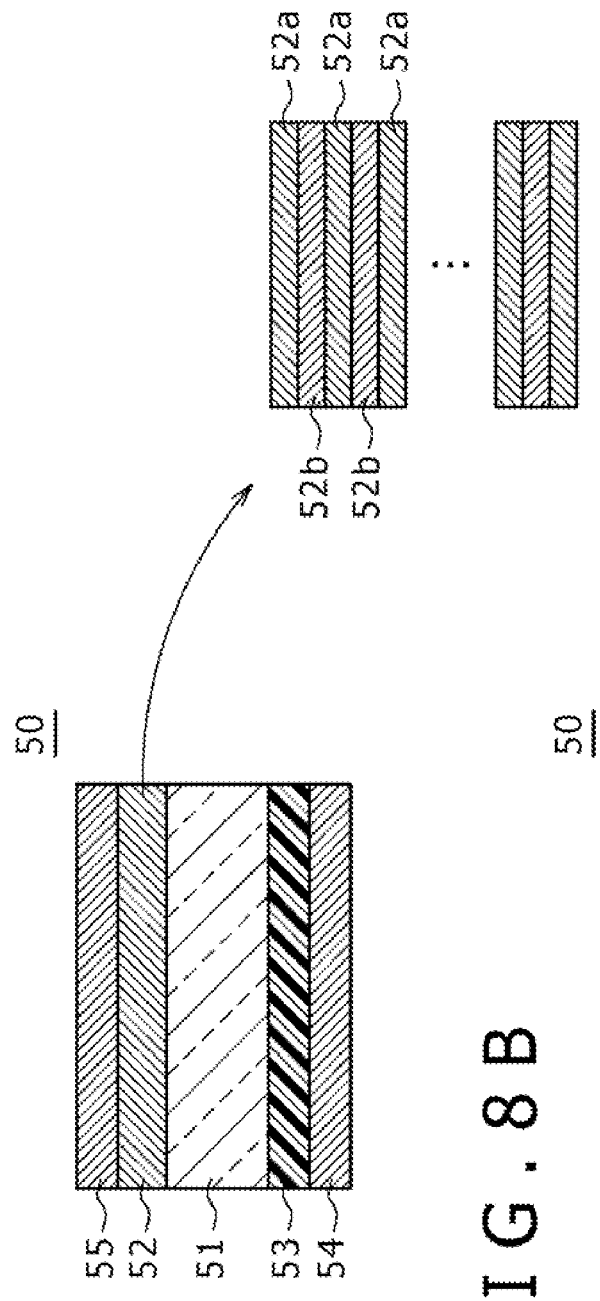
FIGS. 8A and 8B are sectional views schematically showing exemplary configurations of a retardation compensation plate according to an embodiment.

FIGS. 8A and 8B are sectional views showing exemplary configurations of the retardation compensation plate 50. As shown in FIG. 8A, the retardation compensation plate 50 has mainly, a support body 51, a form birefringent film (optical multi-layered film) 52 formed on one surface of the support body 51, and a polymer film 53 bonded on the other surface of the support body 51. On the other hand, a retardation compensation plate 50 shown in FIG. 8B has a pair of supports 51 having the form birefringent film 52 on one surface thereof are adhered on the other surface thereof, while placing the polymer film 53 in between. The surface and the back surface of the retardation compensation plate 50 have, formed thereon, AR coating layers composed of anti-reflection films 54, 55, respectively.

The support body 51 is provided for supporting the form birefringent film 52, and is transparent and isotropic. A material of the support body 51 may be glass such as soda glass, alkali metal-free glass or quartz glass, or may be plastics, among which glass is preferable in view of obtaining a desirable level of isotropy.

The form birefringent film 52 is composed of an optical multi-layered film configured by alternately stacking a first and second optical films 52a, 52b differed in refractive index. Configurations of the first and second optical films 52a, 52b are not specifically limited, so far as the refractive index thereof is differed from each other, and may be selected depending on a desired difference Δnth in refractive index. More specifically, the films may be composed using publicly-known inorganic material such as $TiO_2$, $Nb_2O_5$, $MgO$, $CeO_2$, $ZrO_2$, $Ta_2O_5$, $CaF_2$, $Al_2O_3$, $SiO_2$, $SnO_2$, $MgF_2$ and the like. Sputtering is exemplified as a method of forming these optical films 52a, 52b. It is to be noted, that either of the first and second optical films 52a, 52b having a larger refractive index will be referred to as a high-refractive-index film, and the one having a smaller refractive index will be referred to as a low-refractive-index film.

The vertical retardation, thickness and the number of stacking of the form birefringent film 52 may appropriately be selected depending on a desired difference Δnth in refractive index. More preferably, the vertical retardation falls in the range from 100 nm to 500 nm, both ends inclusive, the thickness is set to 1/200 or more and 1/10 or less of the reference wavelength, and the number of stacking is 10 or more 500 and or less.

Thus-configured form birefringent film 52 is equivalent to a medium having a uniform refractive index to the vertically incident light beam, but has an optical characteristic of a monoaxial, uninclined, negative refractive index ellipsoid (negative C-plate), because it shows anisotropy with respect to obliquely incident light beams. The form birefringent film 52 is highly smooth, so that vertical retardation (Rth) is readily and precisely obtained by appropriately selecting a material of a stack composing the periodical structure, thickness and pitch of the periodical structure.

On the other hand, in-plane retardation is required for the compensation plate for compensating residual retardation with respect to the vertically incident light beam. The form birefringent film 52, having an in-plane retardation of 0, is now necessarily combined with some layer having in-plane retardation. The present embodiment therefore allows the form birefringent film 52 to exhibit in-plane retardation, by combining it with the polymer film 53.

In-plane retardation of the retardation compensation plate 50 of this embodiment is adjusted to 30 nm or smaller. In relation to the liquid crystal panel, in-plane retardation of the polymer film 53 is set so that the in-plane retardation $R0c$ of the retardation compensation plate 50 and the in-plane retardation $R0p$ of the liquid crystal panel 11 satisfy the relation of $1 < R0c/R0p \leq 10$, preferably $2 \leq R0c/R0p \leq 10$, and still more preferably $5 \leq R0c/R0p \leq 8$.

A condition of $1 \geq R0c/R0p$ will be more likely to result in an insufficient amount of retardation to be compensated due to limitation on adjustable angle of rotation of the retardation compensation plate 50, or to result in difficulty in allowing variation in retardation of the individual liquid crystal panels 11, or variation in the angle of placement of optical components. On the other hand, a condition of $10 < R0c/R0p$ will be more likely to increase variation in the amount of retardation to be compensated relative to rotation of the retardation compensation plate 50, and thereby to make fine adjustment difficult.

Figure 9:
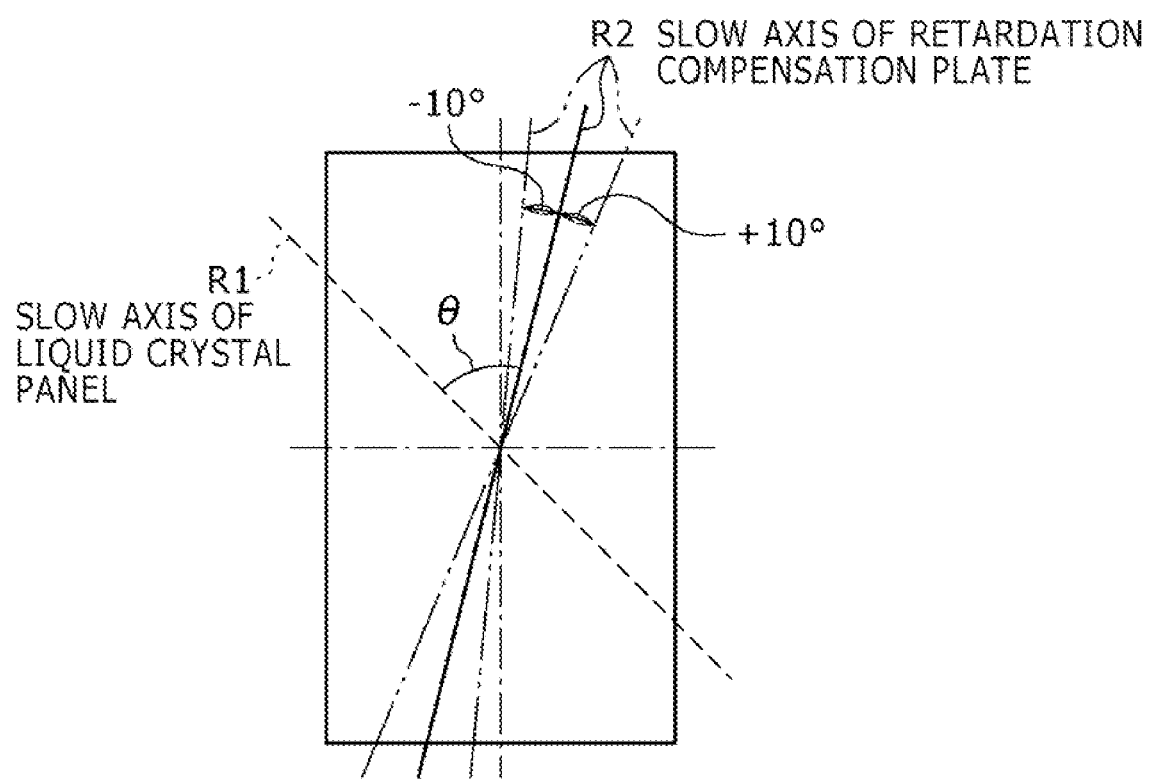
FIG. 9 is a schematic drawing explaining relation between the slow axis of the liquid crystal panel and the slow axis of the retardation compensation plate.

FIG. 9 is a schematic drawing showing direction of the slow axis of the retardation compensation plate 50. As shown in FIG. 9, direction of the slow axis R2 of the retardation compensation plate 50 is set as being rotated by an angle of θ, away from the direction of the slow axis R1 of the liquid crystal panel 11. The angle θ formed between the slow axis R2 of the retardation compensation plate 50 and the slow axis R1 of the liquid crystal panel 11 preferably falls in the range from 45° or larger and 85° or smaller, and more preferably from 45° or larger 65° or smaller. Direction of the slow axis R1 of the liquid crystal panel 11 herein indicates direction of inclined alignment of the liquid crystal molecules.

Direction of slow axis R2 is determined by values of the in-plane retardation ($R0p$) of the liquid crystal panel 11 and the in-plane retardation ($R0c$) of the retardation compensation plate 50. In other words, the retardation compensation plate 50 is combined, while rotating the optical axis thereof, so as to make coincidence between the in-plane retardation of the retardation compensator 40 and the in-plane retardation of the liquid crystal panel 11. The retardation compensator 40 allows the retardation compensation plate 50 to rotate within a ±10° range (−10° to +10°).

Explanation will further be given below, referring to specific examples.

Figure 10:
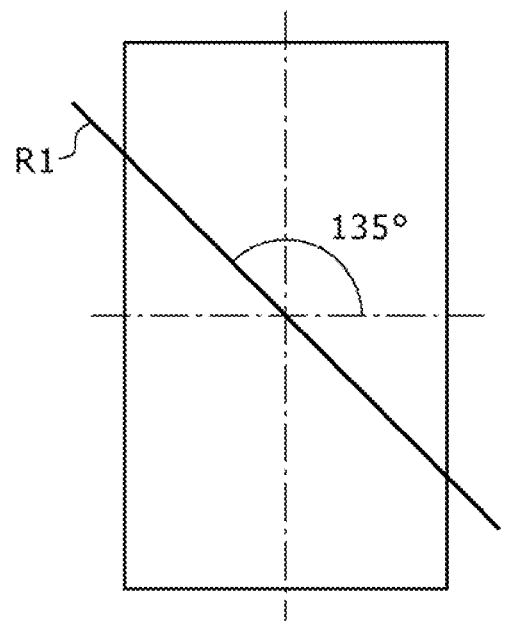
FIG. 10 is a schematic drawing showing direction of the slow axis of the liquid crystal panel.
Figure 11:
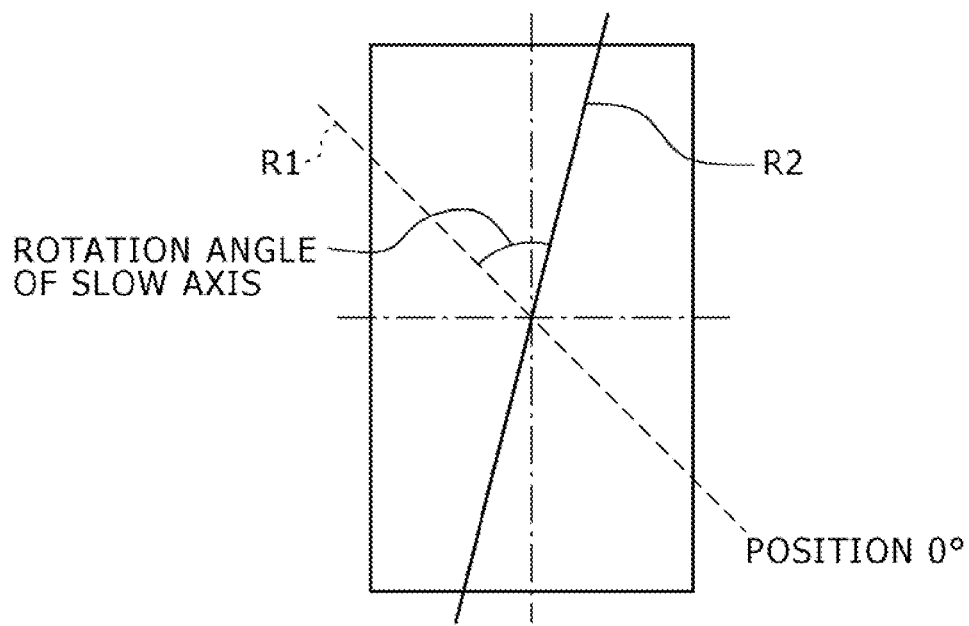
FIG. 11 is a schematic drawing showing direction of the slow axis of the retardation compensation plate.
Figure 12:
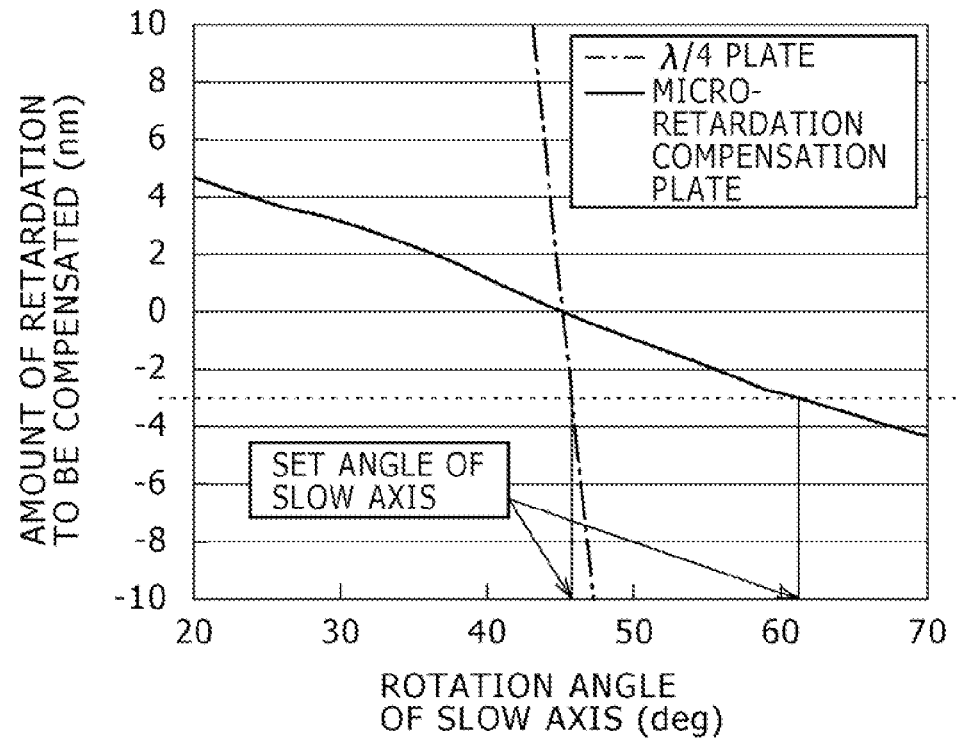
FIG. 12 is a drawing showing a relation between the rotation angle of the retardation compensation plate with respect to the liquid crystal panel.

FIG. 10 is a schematic drawing showing direction of the slow axis of the liquid crystal panel 11. FIG. 11 is a schematic drawing showing direction of the slow axis of the retardation compensation plate. FIG. 12 shows a relation between the angle of rotation (θ) of the slow axis and the amount of retardation to be compensated, obtained when a micro-retardation plate having an in-plane retardation of 6 nm was provided on a liquid crystal panel having an in-plane retardation of 3 nm, and the retardation compensation plate was rotated clockwisely, assuming the position where the slow axis R1 of the liquid crystal panel and the slow axis R2 of the retardation compensation plate coincide as 0°. A dashed-dotted line in FIG. 12 comparatively shows result of measurement when a quarter-wave plate (in-plane retardation of 128 nm) was used.

In the example shown in FIG. 12, the liquid crystal panel having an in-plane retardation of 3 nm needs an amount of retardation to be compensated of −3 nm. The quarter-wave plate causes an extremely large change in the amount of retardation to be compensated relative to rotation of the slow axis thereof, so that any trial of using it as the retardation compensation plate raises a need of setting the angle of rotation of the slow axis at an accuracy as fine as ±0.5° or smaller for the purpose of obtaining an amount of retardation to be compensated of −3 nm or around, raising difficulty in optimizing the contrast. In addition, any shift occurred in the direction of slow axis will result in large change in the amount of retardation to be compensated, and will result in large decrease in the compensative function.

In contrast, use of a micro-retardation compensation plate having an in-plane retardation of 6 nm needs a rotation of the slow axis R2 of as much as 60° or around, in order to obtain an amount of retardation to be compensated of −3 nm. In this case, the amount of retardation to be compensated varies only to a small degree relative to rotation of the slow axis R2, so that it is easy to finely adjust the contrast by rotating the slow axis R2 in a ±10° range, providing flexibility to variation in the liquid crystal panels. It is understood that even accidental shifting in the direction of the slow axis R2 causes only a small decrease in the compensative function.

As has been described in the above, the contrast can precisely be optimized, by adjusting the direction of the slow axis of the retardation compensation plate, and at the same time by providing a rotating mechanism for the fine adjustment, thereby realizing retardation compensation while flexibly allowing variation in the amount of pre-tilting for the individual liquid crystal panels.

Figure 13:
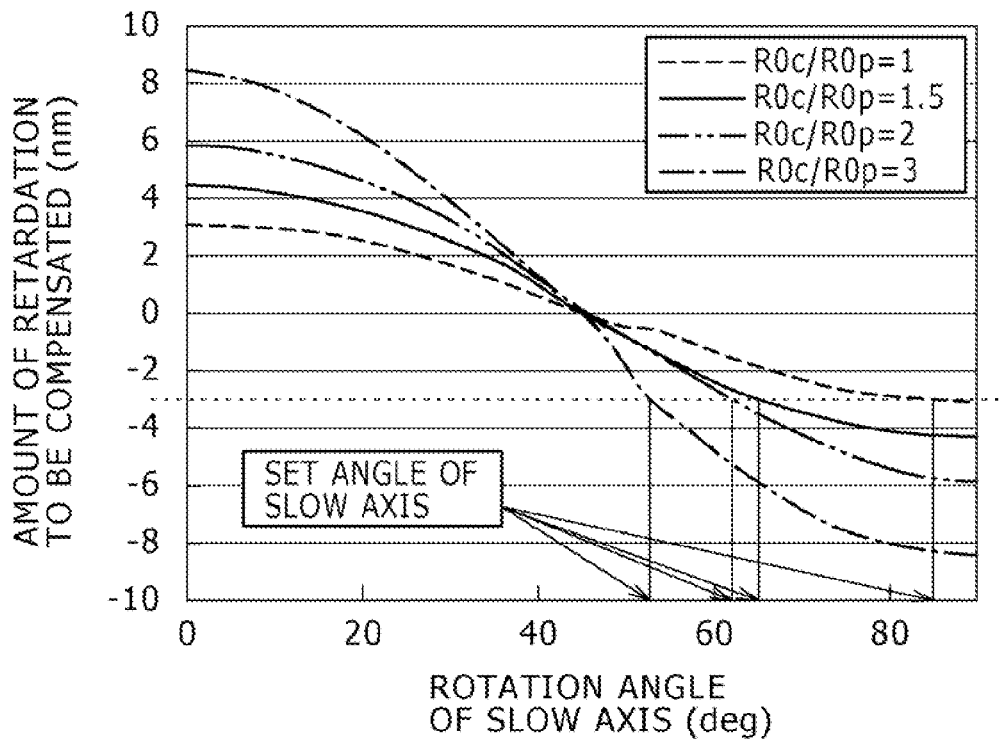
FIG. 13 is a drawing showing relations between the rotation angle of the retardation compensation plate and the amount of retardation to be compensated, when a plurality of retardation compensation plates differed in in-plane retardation are applied to the liquid crystal panel.

Next, FIG. 13 shows relations between the angle of rotation of the slow axis R2 of the retardation compensation plate and the amount of retardation to be compensated, when ratio (R0c/R0p) of the in-plane retardation R0c of the retardation compensation plate and the in-plane retardation R0p of the liquid crystal panel was varied. Examples shown in the drawing relate to the case where the in-plane retardation R0p of the liquid crystal panel is 3 nm, and the in-plane retardation R0c of the retardation compensation plate is 3 nm (R0c/R0p=1), 4.5 nm (R0c/R0p=1.5), 6 nm (R0c/R0p=2) and 9 nm (R0c/R0p=3), respectively.

As shown in FIG. 13, in the case of R0c/R0p=1, an amount of retardation to be compensated of −3 nm is obtained by rotating the slow axis R2 of the retardation compensation plate by 85° or around with regard to the slow axis R1 of the liquid crystal panel. The contrast is compensated in a stable manner, almost without causing variation in the amount of retardation to be compensated with respect to positional changes of the axis. However, if the in-plane retardation of the liquid crystal panel varies beyond 3 nm, the adjustment is needed by an angle of rotation of as large as ±10° or more, and may sometimes fail in obtaining a necessary amount of retardation to be compensated. It is difficult to attach a mechanism capable of rotating the retardation compensation plate beyond ±10°, in consideration of a structure allowing assembly of the retardation compensator onto the liquid crystal panel.

In contrast, in the case of R0c/R0p=1.5, an amount of retardation to be compensated of approximately −3 nm is obtained by rotating the slow axis R2 of the retardation compensation plate by 65° or around away from the slow axis R1 of the liquid crystal panel. Similar amount of retardation to be compensated is obtained by rotation by 62° to 63° or around in the case of R0c/R0p=2, and by rotation by 52° or around in the case of R0c/R0p=3. Variation in the amount of retardation to be compensated with respect to positional changes of the axis of the retardation compensation plate may be larger than that for the case of R0c/R0p=1, but not so large as the changes caused by the quarter-wave plate, causing only a small influence on the contrast. The amount of retardation to be compensated is adjustable both in the increasing and decreasing directions from a center value of −3 nm, and can be optimized with respect to the liquid crystal panel having variation in retardation. The retardation compensation plate has also flexibility to variation in the amount of retardation of the liquid crystal panel, within an adjustable range of the angle of rotation of ±10° or smaller.

As has been described above, by making the in-plane retardation R0c of the retardation compensation plate larger than the in-plane retardation R0p of the liquid crystal panel, so as to satisfy the relationship of R0c/R0p>1, the amount of in-plane retardation of the liquid crystal panel is compensated in a precise manner, and the contrast becomes readily adjustable.

In-plane difference in refractive index of the polymer film is $\Delta n0<0.005$, proving readiness in lowering of $\Delta n0$. As a consequence, leakage of light is reduced by virtue of small changes in the state of polarization of the reflected beam, and at the same time, the AR characteristics are improved by virtue of the small difference in refractive index. The glass transition temperature (Tg) can be elevated by selecting the material, and thereby the retardation compensation plate excellent also in environmental resistance can be observed. Fine in-plane retardation can be controlled by uniaxial or biaxial orientation. In this case, stack of the films is also adoptable. Because the vertical retardation Rth is appropriately adjustable by the form birefringent film, the number of necessary films reduces. It is therefore made possible to lower non-uniformity in the in-plane retardation and non-uniformity in the direction of the optical axis.

For the polymer film 53, it is preferable to use a material having properties of heat resistance, low water absorption and low photo-elastic modulus, and having a small variation in the retardation. Films satisfying these characteristics are exemplified by polymer films such as norbornene-base film, polycarbonate (PC) film, cellulose triacetate film, polymethyl methacrylate (PMMA) film and so forth. Among these, the norbornene-base film has particularly excellent characteristics.

The polymer film 53 is adhered on the other surface of the support body 51, supporting on one surface thereof the optical multi-layered film 52. Methods of bonding the polymer film 53 and the support body 51 are not specifically limited, allowing adoption of adhesion using pressure-sensitive adhesive such as tacky agent or adhesive sheet, and various adhesives containing photo-curing resin, thermosetting resin and the like. Resins of acrylic base and epoxy base are adoptable to any of the adhesives, where the acrylic resin is preferable in view of optical characteristics such as transparency.

Refractive index of the adhesive after curing is preferably equivalent to the refractive index of the polymer film 53, or preferably falls in the middle of the refractive index of the polymer film 53 and the refractive index of the support body 51. Thermal expansion coefficient of the adhesive after curing is preferably equivalent to the thermal expansion coefficient of the polymer film 53, or preferably falls in the middle of the thermal expansion coefficient of the polymer film 53 and the thermal expansion coefficient of the support body 51.

The anti-reflection films 54, 55 are provided for preventing reflection of the incident light beams (red light, green light and blue light, for example), and are preferably adjusted in the reflectivity thereof to 1% or lower. By adjusting the reflectivity to 1% or lower, lowering in the contrast due to the reflected beams is suppressed. The anti-reflection films 54, 55 are a single-layered, anti-reflection film or a multi-layered, anti-reflection film having two or more layers. Sputtering process, for example, is exemplified as a method of forming these anti-reflection films 54, 55.

As has been described above, the retardation compensation plate 50 in this embodiment was configured by a stack of the form birefringent film 52 and the polymer film 53, so that it is made possible to configure a retardation compensation plate excellent in environmental resistance, small in variations of in-plane retardation, vertical retardation and non-uniformity in the direction of optical axis, excellent in controllability of the vertical retardation, and low in in-plane difference in refractive index.

In particular, the retardation compensation plate 50 of this embodiment is readily adjustable in the vertical retardation (Rth) through controlling thickness of the form birefringent film 52, and therefore makes it no more necessary to use a plurality of films for adjustment of Rth. Sample-wise Rth adjustment is also executable at the same time with formation of the anti-reflection films 54, 55. In addition, the retardation compensation plates is configured to have Rth optimized for each of the liquid crystal panels of the individual colors, so that influences by the dispersion is reduced, thereby improving quality of displayed image.

EXAMPLES

Paragraphs below will explain Examples of the present application, without limiting the present application.

Example 1

Controllability of vertical retardation (Rth) of the form birefringent film manufactured as described below was evaluated.

Figure 14:
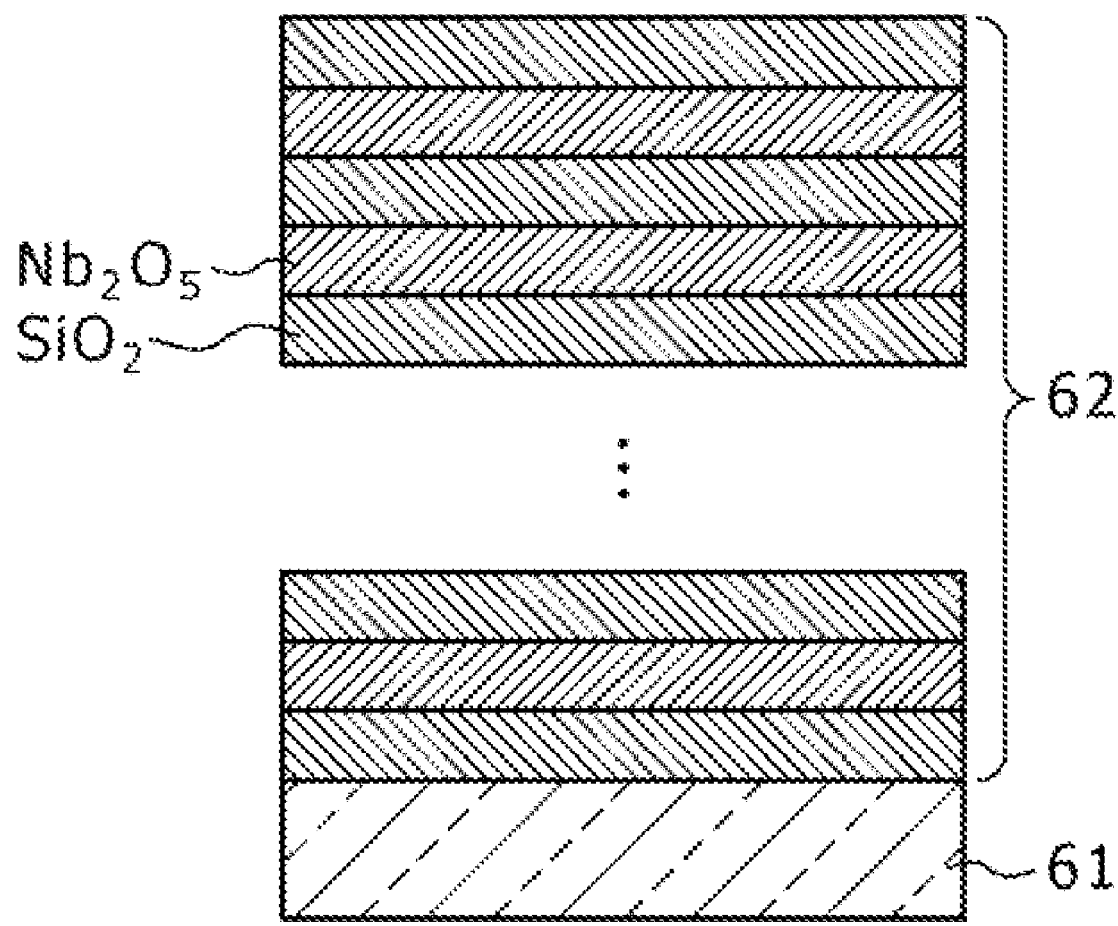
FIG. 14 is a schematic drawing showing an overall configuration of a sample explained in Example 1.

As shown in FIG. 14, on a support body 61 composed of a quartz substrate, a $SiO_2$ film as a low-refractive-index film and a $Nb_2O_5$ film as a high-refractive-index film were alternately stacked up to 70 layers in total (sample 1), 90 layers in total (sample 2) and 100 layers in total (sample 3), to thereby manufacture a form birefringent layer (optical multi-layered film) 62.

Figure 15:
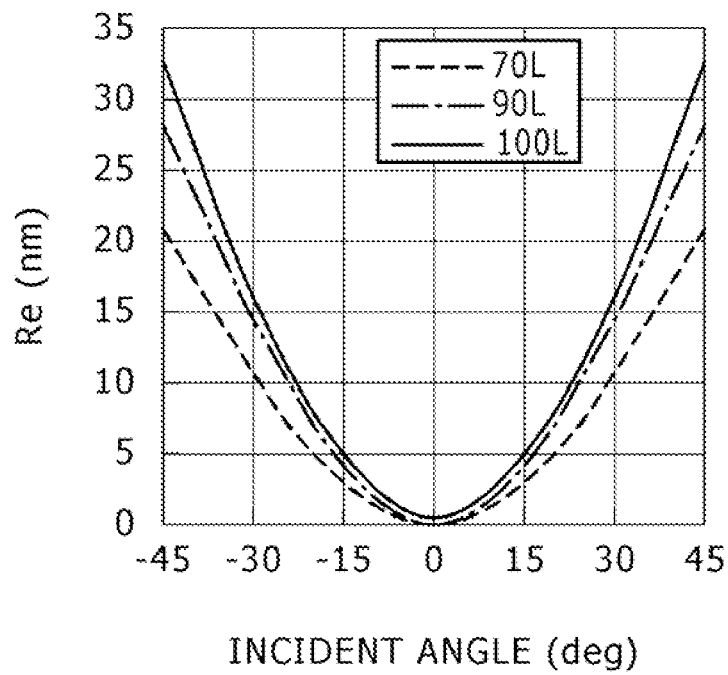
FIG. 15 is a drawing showing an incident angle dependence of retardation (Re) in various samples explained in Example 1 of the present application.

Thickness of both of the $SiO_2$ film and the $Nb_2O_5$ film were adjusted to 10 nm. "ULDis-900CV" from ULVAC Inc. was used as a film forming apparatus. Incident angle dependence of retardation of these samples 1 to 3 were measured using "RETS-100" from Otsuka Electronics Co., Ltd. Results are shown in FIG. 15. In the drawing, the abscissa represents angle of incidence, and the ordinate represents magnitude of Re (retardation).

As shown in FIG. 15, the samples showed a retardation of 0 nm for the vertically incident light beam, or expressed as in-plane retardation R0=0 nm. Under incidence of oblique beams, the retardation increased as the angle increased. The refractive index was therefore found to satisfy the relation of nx=ny>nz, proving that the samples were negative C-plates. The vertical retardation Rth increased according to the order of the number of layers of 70, 90 and 100. This is ascribable to increase in the total thickness with increase in the number of layers.

Figure 16:
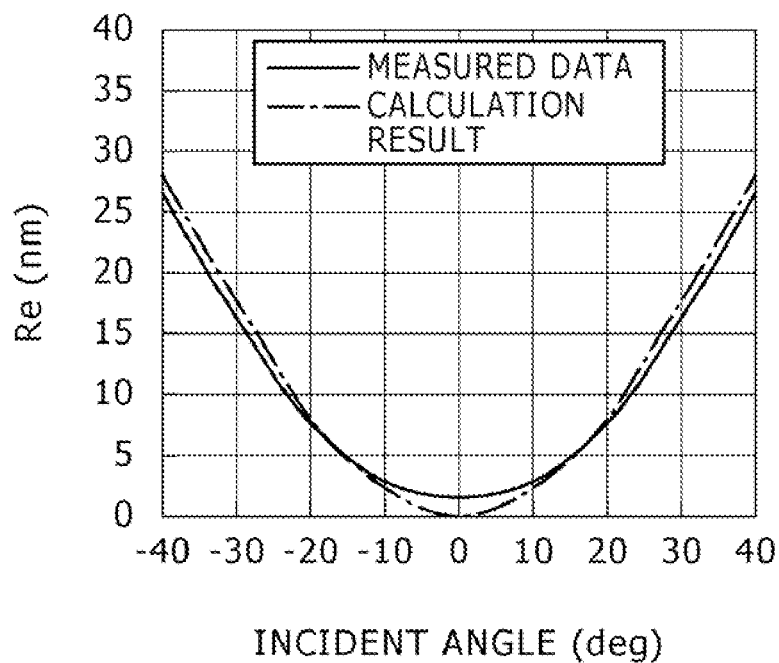
FIG. 16 is a drawing comparatively showing measured data and calculated values of retardation (Re) in the sample explained in Example 1 of the present application.

FIG. 16 comparatively shows measured data of incident angle dependence of Re and calculated values of incident angle dependence of Re estimated using the equation (1) above, obtained for the sample (sample 3) composed of 100 layers in total of the $SiO_2$ and the $Nb_2O_5$ films each having a thickness of 10 nm. In FIG. 16, the solid line expresses the measured data, and the dashed-dotted line represents the calculated results. As is obvious from FIG. 16, the measured data and the calculated values showed a good coincidence, suggesting that Rth is controllable in a precise manner through controlling the thickness of the films.

Example 2

A retardation compensation plate having the form birefringent film according to other embodiment of the present application, and a retardation compensation plate not provided with such form birefringent film were manufactured, and the individual effects of compensating retardation were confirmed.

As the form birefringent film, a repeating multi-layered film of $SiO_2$ films and the $Nb_2O_5$ films stacked up to 70 layers in total was formed on each of two quartz substrates of 0.3 mm thick. The thickness was determined as 10 nm for the both. "ULDis-900CV" from ULVAC Inc. was used as a film-forming apparatus. AR coating adapted to the blue band was then given on the surface of the samples. Reflectivity was found to be 0.5% or less in the band from 430 nm to 500 nm.

Both quartz substrates were bonded on their surfaces, opposite to the film-forming surfaces, while placing a norbornene-base polymer film ("Arton film (trade name)" manufactured by JSR Corporation) having an in-plane retardation of 8 nm, and a vertical retardation of −40 nm in between (see FIG. 8B). A visible-light-curable resin was used for the adhesion. The obtained stack was then processed using a slicer, and cut into pieces of a target size. In this way, the retardation compensation plate having an in-plane retardation R0=8 nm, a vertical retardation Rth=−320 nm, and a reflectivity in the blue band of 0.5% or lower was obtained.

Comparative Example 1

Figure 17:
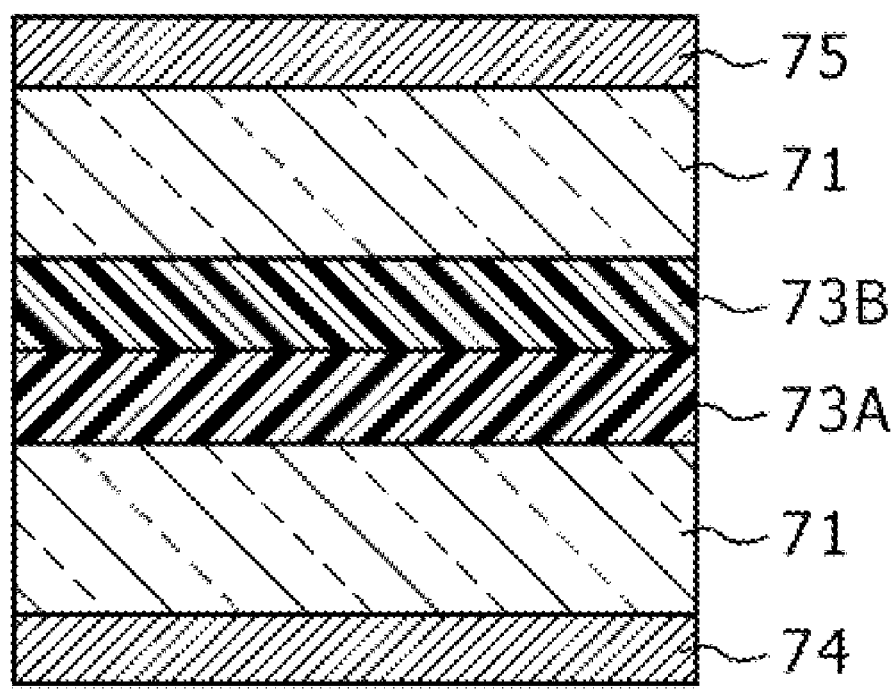
FIG. 17 is a schematic drawing showing an overall configuration of the sample explained in Comparative Example 1 of the present application.

As shown in FIG. 17, AR coating layers 74, 75 adapted to the blue band were respectively formed on two quartz substrates 71, 71 of 0.3 mm thick. Reflectivity of the AR coating layers 74, 75 was found to be 0.5% or lower in the band from 430 nm to 500 nm.

On the surfaces, opposite to the film-forming surfaces, of the individual quartz substrates 71, 71, a biaxially-oriented, norbornene-base polymer film 73A having an in-plane retardation of 50 nm and a vertical retardation of −100 nm, and a biaxially-oriented, norbornene-base polymer film 73B having an in-plane retardation of 70 nm and a vertical retardation of −100 nm were formed, and the polymer films 73A and 73B were then bonded so as to adjust the in-plane retardation after stacking to 20 nm, while aligning the optical axes thereof so as to be orthogonal to each other. A visible-light-curable resin was used for the adhesion. The obtained stack was then processed using a slicer, and cut into pieces of a target size. In this way, the retardation compensation plate having an in-plane retardation R0=20 nm, a vertical retardation Rth=−200 nm, and a reflectivity in the blue band of 0.5% or lower was obtained.

Retardation compensation characteristics were evaluated for both of the sample according to Example 2, and the sample according to Comparative Example 1. An optical system having a vertically-aligned, reflection-type liquid crystal panel and a wire-grid polarizer in combination was used (see FIG. 2). The retardation compensation plate was disposed between the liquid crystal panel for blue color and the wire-grid polarizer for blue color, the retardation compensation plate was then rotated around a rotation axis which is the normal direction to the retardation compensation plate so as to determine an angle of rotation giving a maximum contrast, and black intensity, white intensity and contrast at that angle were measured. Results of the measurement were shown in Table 1.

TABLE 1

|  | Black intensity | White intensity | Contrast |
|---|---|---|---|
| Example 2 | 3.34 | 10510 | 3147 |
| Comparative Example 1 | 3.56 | 10570 | 2969 |

As shown in Table 1, the contrast in Example 2 was 3147, whereas the contrast in Comparative Example 1 was 2969, from which superiority of the form birefringent film was confirmed. Although not carried out in this Example, the contrast is further improved, by optimizing the number of layers and thickness of the form birefringent film, as being adapted to the blue band.

Examples 3 to 6

The amount of retardation to be compensated with respect to the liquid crystal panel, observed by rotating the slow axes of the retardation compensation plates of Examples and Comparative Example was measured as described below. The rotation was made clockwisely, assuming the position where the slow axis R1 of the liquid crystal panel and the slow axis R2 of the retardation compensation plate coincide as 0° (see FIG. 10, 11). The in-plane retardation (R0$p$) of the liquid crystal panel was adjusted to 2.5 nm.

Example 3

A retardation compensation plate having an in-plane retardation R0$c$=12 nm was prepared, and changes in the amount of retardation to be compensated, observed when the slow axis R2 of the retardation compensation plate was rotated with respect to the slow axis R1 of the liquid crystal panel, were measured (R0$c$/R0$p$=4.8).

Comparative Example 2

A retardation compensation plate having an in-plane retardation R0$c$=30 nm was prepared, and changes in the amount of retardation to be compensated, observed when the slow axis R2 of the retardation compensation plate was rotated with respect to the slow axis R1 of the liquid crystal panel, were measured (R0$c$/R0$p$=12).

Figure 18:
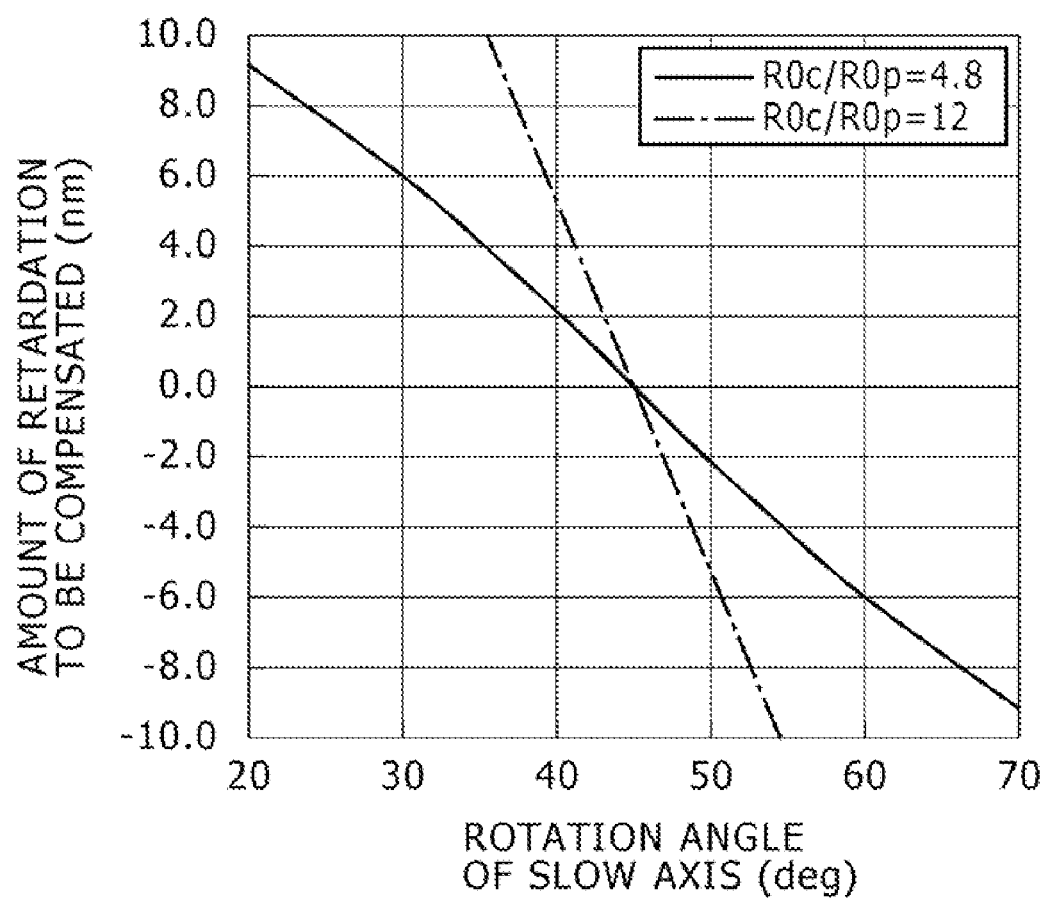
FIG. 18 is a drawing showing changes in the amount of retardation to be compensated in relation to the angle of rotation of the retardation compensation plate explained in Example 3 of the present application.

FIG. 18 shows measured results of the amount of retardation to be compensated in the above Example 3 and Comparative Example 2. In the case of the liquid crystal panel having an in-plane retardation R0$p$ of 2.5 nm, an amount of retardation to be compensated of −2.5 nm will be necessary for the retardation compensation plate. FIG. 18 teaches the following.

That is, in Comparative Example 2, it is necessary to set the slow axis R2 at an accuracy of ±0.5° or lower in order to obtain the amount of retardation to be compensated of as much as −2.5 nm or around, because variation in the amount of retardation to be compensated with respect to rotation of the slow axis is extremely large, suggesting difficulty in optimizing the contrast. It is also understood that any accidental shifting in the direction of the slow axis R2 causes a large variation in the amount of retardation to be compensated, and consequently reduces the compensative function to a considerable degree.

In contrast in Example 3, the slow axis R2 is conveniently rotated by approximately 51° in order to obtain an amount of retardation to be compensated of −2.5 nm, proving readiness in fine adjustment of the contrast through rotation of the slow axis R2, by virtue of small variation in the amount of retardation to be compensated with respect to rotation of the slow axis R2. It is also understood that flexibility to variation in the liquid crystal panels and variation in the angle of setting of optical components can be ensured, because the contrast can be compensated within the range of ±2 nm. In addition, it is found that any accidental shifting in the direction of the slow axis R2 results in only a small degradation in the compensative function.

Next, Examples verifying relations between the in-plane retardation R0$c$ of the retardation compensation plate and the in-plane retardation R0$p$ of the liquid crystal panel will be explained.

Example 4

A retardation compensation plate having an in-plane retardation R0$c$=20 nm was prepared, and changes in the amount of retardation to be compensated, observed when the slow axis R2 of the retardation compensation plate was rotated with respect to the slow axis R1 of the liquid crystal panel, were measured (R0$c$/R0$p$=8).

Example 5

A retardation compensation plate having an in-plane retardation R0$c$=9 nm was prepared, and changes in the amount of retardation to be compensated, observed when the slow axis R2 of the retardation compensation plate was rotated with respect to the slow axis R1 of the liquid crystal panel, were measured (R0$c$/R0$p$=3.6).

Example 6

A retardation compensation plate having an in-plane retardation R0$c$=6 nm was prepared, and changes in the amount of retardation to be compensated, observed when the slow axis R2 of the retardation compensation plate was rotated with respect to the slow axis R1 of the liquid crystal panel, were measured (R0$c$/R0$p$=2.4).

Comparative Example 3

A retardation compensation plate having an in-plane retardation R0$c$=2.5 nm was prepared, and changes in the amount of retardation to be compensated, observed when the slow axis R2 of the retardation compensation plate was rotated with respect to the slow axis R1 of the liquid crystal panel, were measured (R0$c$/R0$p$=1).

Figure 19:
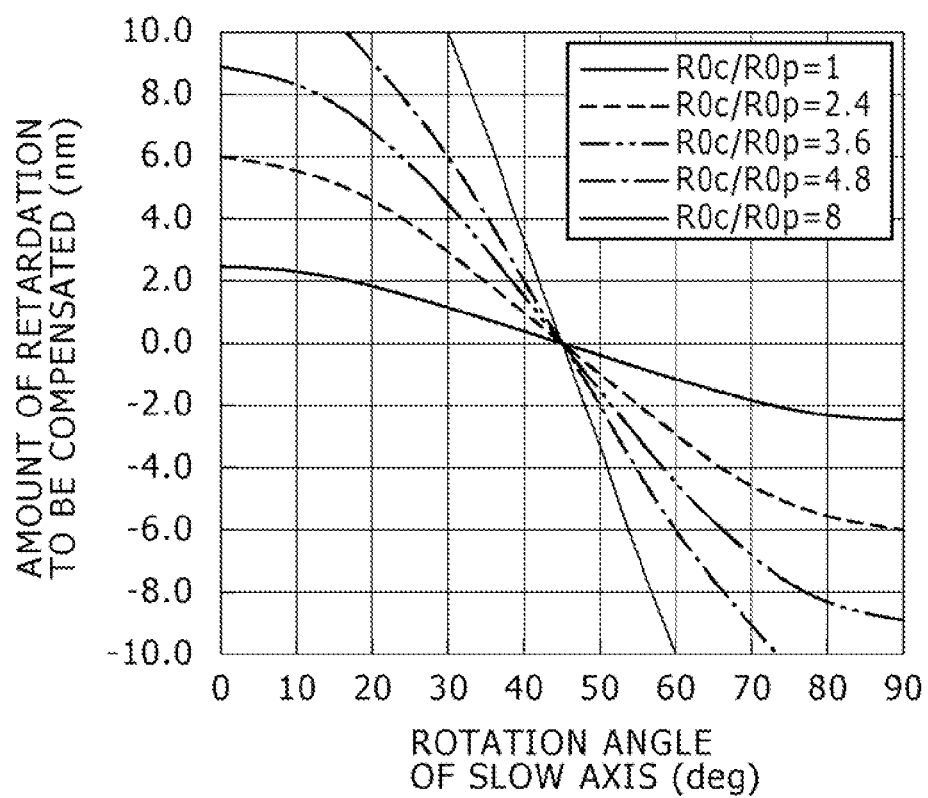
FIG. 19 is a drawing showing changes in the amount of retardation to be compensated in relation to the angle of rotation of the retardation compensation plates explained in Examples 3 to 6 of the present application.

FIG. 19 shows measured results of the amount of retardation to be compensated in Examples 3 to 6 and Comparative Example 3. As shown in FIG. 19, Comparative Example 3 based on the relation of R0$c$/R0$p$=1 successfully obtained an amount of retardation to be compensated of −2.5 nm, by rotating the slow axis R2 of the retardation compensation plate by approximately 85° from the slow axis R1 of the liquid crystal panel. The contrast is compensated in a stable manner, almost without causing variation in the amount of retardation to be compensated with respect to positional changes of the axis. However, if the in-plane retardation of the liquid crystal panel varies beyond 2.5 nm, the adjustment must be made by an angle of rotation of as large as ±10° or more, and may sometimes fail in obtaining a necessary amount of retardation to be compensated. It is difficult to attach a mechanism capable of rotating the retardation compensation plate beyond ±10°, in consideration of a structure allowing assembly of the retardation compensator onto the liquid crystal panel.

In contrast, in Example 3 based on the relation of R0c/R0p=4.8, an amount of retardation to be compensated of approximately −2.5 nm is obtained by rotating the slow axis R2 of the retardation compensation plate by approximately 51° with respect to the slow axis R1 of the liquid crystal panel. Similar amount of retardation to be compensated is obtained by rotation by approximately 49° in Example 4 based on the relation of R0c/R0p=8, by rotation by approximately 53° in Example 5 based on the relation of R0c/R0p=3.6, and by rotation by approximately 57° in Example 6 based on the relation of R0c/R0p=2.4. Variation in the amount of retardation to be compensated with respect to positional changes of the axis of the retardation compensation plate may be larger than that in the case of R0c/R0p=1, but not so large as the changes observed in Comparative Example 2 based on the relation of R0c/R0p=12, causing only a small influence on the contrast. The amount of retardation to be compensated is adjustable both in the increasing and decreasing directions from a center value of −2.5 nm, and can be optimized with respect to the liquid crystal panel having variation in retardation. The retardation compensation plate has also flexibility to variation in the amount of retardation of the liquid crystal panel, within an adjustable range of the angle of rotation of ±10° or lower, for example, ±5° or lower.

As has been described above, the in-plane retardation of the liquid crystal panel is compensated in a precise manner, and adjustment of contrast is simplified, by adjusting the in-plane retardation R0c of the retardation compensator so as to satisfy the relationship of 1<R0c/R0p, and more preferably the relationship of 2≦R0c/R0p.

The relation of 10<R0c/R0p increases variation in the amount of retardation to be compensated with respect to angular change of the slow axis R2, and thereby making fine adjustment difficult. Within the range expressed by 10≧R0c/R0p, adverse effects on the contrast are be reduced.

The embodiments and Examples of the present application have been described in the above, of course without limiting the present application, allowing various modifications based on the technical spirit of the present application.

For example, although the form birefringent film 52 constituting the retardation compensation plate 50 was formed on the support body 51 in the above-described embodiments, the form birefringent film 52 may directly be formed on the polymer film 53, without using the support body 51.

Although the above embodiments explained the liquid crystal display device adoptable to the projection-type image display device, while exemplifying the reflection-type liquid crystal display device, the present application is not limited thereto, and is also applicable to transmission-type liquid crystal display device. In this case, it is good enough for the retardation compensation plate to be provided with the anti-reflection film only on the surface of the beam incident side, out of both main surfaces.

Alternatively, the optical system of the projection-type image display device is not limited to the three-plate-type one as described in the above, but may be a single-plate-type one. Still alternatively, the present application is also applicable to the direct-viewing-type liquid crystal display device as a flat panel display.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A retardation compensation plate having a birefringent property, for compensating residual retardation of a liquid crystal panel, the retardation compensation plate comprising:
   a combined unit formed of:
      an optical multi-layered film composed of a plurality of layers having different refractive indices stacked in a regular order; and
      a polymer film; and
   wherein the retardation compensation plate and the liquid crystal panel have in-plane retardations that satisfy a relationship:

$$1 < R0c/R0p \leq 10$$

where R0c is an in-plane retardation of the retardation compensation plate and R0p is an in-plane retardation of the liquid crystal panel.

2. The retardation compensation plate as claimed in claim 1, wherein the optical multi-layered film has a negative vertical retardation.

3. The retardation compensation plate as claimed in claim 1, wherein the optical multi-layered film is a birefringent film.

4. The retardation compensation plate as claimed in claim 1, wherein the polymer film has an in-plane retardation of 30 nm or lower.

5. The retardation compensation plate as claimed in claim 1, wherein the polymer film has an in-plane difference in refractive index of less than 0.005.

6. The retardation compensation plate as claimed in claim 1, wherein the polymer film is a norbornene-base resin film.

7. A retardation compensator for compensating residual retardation of a liquid crystal panel, the retardation compensator comprising:
   a retardation compensation plate having a birefringent property, and
   wherein the retardation compensation plate is formed of a combined unit of an optical multi-layered film composed of
      a plurality of layers having different refractive indices stacked in a regular order, and
      a polymer film, and
   wherein the retardation compensation plate and the liquid crystal panel have in-plane retardations that satisfy the relationship:

$$1 < R0c/R0p \leq 10$$

where R0c is an in-plane retardation of the retardation compensation plate and R0p is an in-plane retardation of the liquid crystal panel.

8. The retardation compensator as claimed in claim 7, further comprising a rotating means rotating the retardation compensation plate around a rotation axis which is substantially perpendicular to a main surface of the liquid crystal panel.

9. The retardation compensator as claimed in claim 8, wherein the angular range of rotation of the retardation compensation plate is ±10° or lower.

10. A liquid crystal display device comprising:
a liquid crystal panel controlling a transmitted light; and
a retardation compensator, disposed on the liquid crystal panel, including a retardation compensation plate having a birefringent property,
wherein the retardation compensation plate includes a combined unit formed of an optical multi-layered film composed of
a plurality of layers having different refractive indices stacked in a regular order, and
a polymer film, and
wherein the retardation compensation plate and the liquid crystal panel have in-plane retardations that satisfy the relationship:

$$1 < R0c/R0p \leq 10$$

where $R0c$ is an in-plane retardation of the retardation compensation plate and $R0p$ is an in-plane retardation of the liquid crystal panel.

11. The liquid crystal display device as claimed in claim 10, wherein the retardation compensation plate has an angle between a slow axis of the retardation compensation plate and a slow axis of the liquid crystal panel is 45° or more and 85° or less.

12. The liquid crystal display device as claimed in claim 10, wherein the retardation compensator includes a rotating means rotating the retardation compensation plate around a rotation axis which is substantially perpendicular to a main surface of the liquid crystal panel.

13. The liquid crystal display device as claimed in claim 10, wherein the liquid crystal panel is composed of a reflection-type liquid crystal display element.

14. The liquid crystal display device as claimed in claim 10, wherein the liquid crystal panel is composed of a vertically-aligned liquid crystal display element.

15. A projection-type image display device comprising:
a light source for emitting light source beam;
a polarization beam splitter for performing a polarization splitting of the light source beam;
a liquid crystal panel for modulating the light source beam undergone the polarization splitting to produce an image-forming beam;
a screen on which the image-forming beam is displayed;
a projection lens for projecting the image-forming beam onto the screen; and
a retardation compensator, provided on the liquid crystal panel, including a retardation compensation plate having a birefringent property,
wherein the retardation compensation plate includes a combined unit formed of an optical multi-layered film composed of
a plurality of layers having different refractive indices stacked in a regular order, and
a polymer film, and
wherein the retardation compensation plate and the liquid crystal panel have in-plane retardations that satisfy a relationship:

$$1 < R0c/R0p \leq 10$$

where $R0c$ is an in-plane retardation of the retardation compensation plate and $R0p$ is an in-plane retardation of the liquid crystal panel.

16. The projection-type image display device as claimed in claim 15, further comprising an optical splitter system splitting the light source beam into beams of three principal colors, wherein:
the liquid crystal panel and the retardation compensator are respectively disposed for the split beam of each color.

17. The projection-type image display device as claimed in claim 16, wherein the optical multi-layered film constituting the retardation compensation plate is differed in thickness for each color.

18. The projection-type image display device as claimed in claim 15, wherein the polarization beam splitter is a wire-grid polarizer.

19. A retardation compensation plate having a birefringent property, for compensating residual retardation of a liquid crystal panel, the retardation compensation plate comprising:
a combined unit formed of:
an optical multi-layered film composed of a plurality of layers having different refractive indices stacked in a regular order; and
a polymer film; and
wherein the retardation compensation plate and the liquid crystal panel have in-plane retardations that satisfy a relationship:

$$1 < R0c/R0p \leq 10$$

where $R0c$ is an in-plane retardation of the retardation compensation plate and $R0p$ is an in-plane retardation of the liquid crystal panel, and
wherein the polymer film has an in-plane difference in refractive index of less than 0.005.

20. The retardation compensation plate as claimed in claim 1, wherein the optical multi-layered film has zero in-plane retardation, and the polymer film has an in-plane retardation greater than zero.

* * * * *